US011089212B2

(12) United States Patent
Minoshima

(10) Patent No.: US 11,089,212 B2
(45) Date of Patent: Aug. 10, 2021

(54) IMAGE CAPTURE APPARATUS THAT RECORDS VIDEO SIGNAL CAPTURED AT VARIABLE FRAME RATE AS MOVING IMAGE DATA, METHOD OF CONTROLLING SAME, AND STORAGE MEDIUM

(71) Applicant: CANON KABUSHIKI KAISHA, Tokyo (JP)

(72) Inventor: Toshio Minoshima, Hiratsuka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/792,911

(22) Filed: Feb. 18, 2020

(65) Prior Publication Data

US 2020/0275020 A1 Aug. 27, 2020

(30) Foreign Application Priority Data

Feb. 27, 2019 (JP) .............................. JP2019-034469

(51) Int. Cl.
*H04N 5/232* (2006.01)

(52) U.S. Cl.
CPC ..... *H04N 5/23232* (2013.01); *H04N 5/23216* (2013.01); *H04N 5/23245* (2013.01)

(58) Field of Classification Search
CPC ........... H04N 5/23232; H04N 5/23245; H04N 5/23216; H04N 21/8547; G11B 27/3036
See application file for complete search history.

(56) References Cited

U.S. PATENT DOCUMENTS

2008/0297613 A1* 12/2008 Takahashi .......... H04N 5/23245
348/221.1
2019/0199890 A1 6/2019 Saito et al.

FOREIGN PATENT DOCUMENTS

JP 2015-192227 A 11/2015

OTHER PUBLICATIONS

"SMPTE ST 12-3:2016—SMPTE Standard—Time Code for High Frame Rate Signals and Formatting in the Ancillary Data Space," in SMPTE ST 12-3:2016, vol., No., pp. 1-15, Mar. 15, 2016, doi: 10.5594/SMPTE.SMPTEST12-3.2016. (Year: 2016).*

* cited by examiner

*Primary Examiner* — Timothy J Henn
(74) *Attorney, Agent, or Firm* — Venable LLP

(57) ABSTRACT

An image capture apparatus capable of reproducing or outputting moving image data at a rate corresponding to the real time even if the frame rate is changed during recording of a time code adapted to a high frame rate. A time code to be added to each frame of moving image data is generated. The time code includes a type for differentiating between frames at a high-frame rate. The time code is added to each frame of the moving image data. An image-capturing frame rate of the moving image data is changed according to a frame rate-changing request from a user. The image-capturing frame rate of the moving image data is changed at a timing at which the value of sub frame of the time code becomes zero.

14 Claims, 20 Drawing Sheets

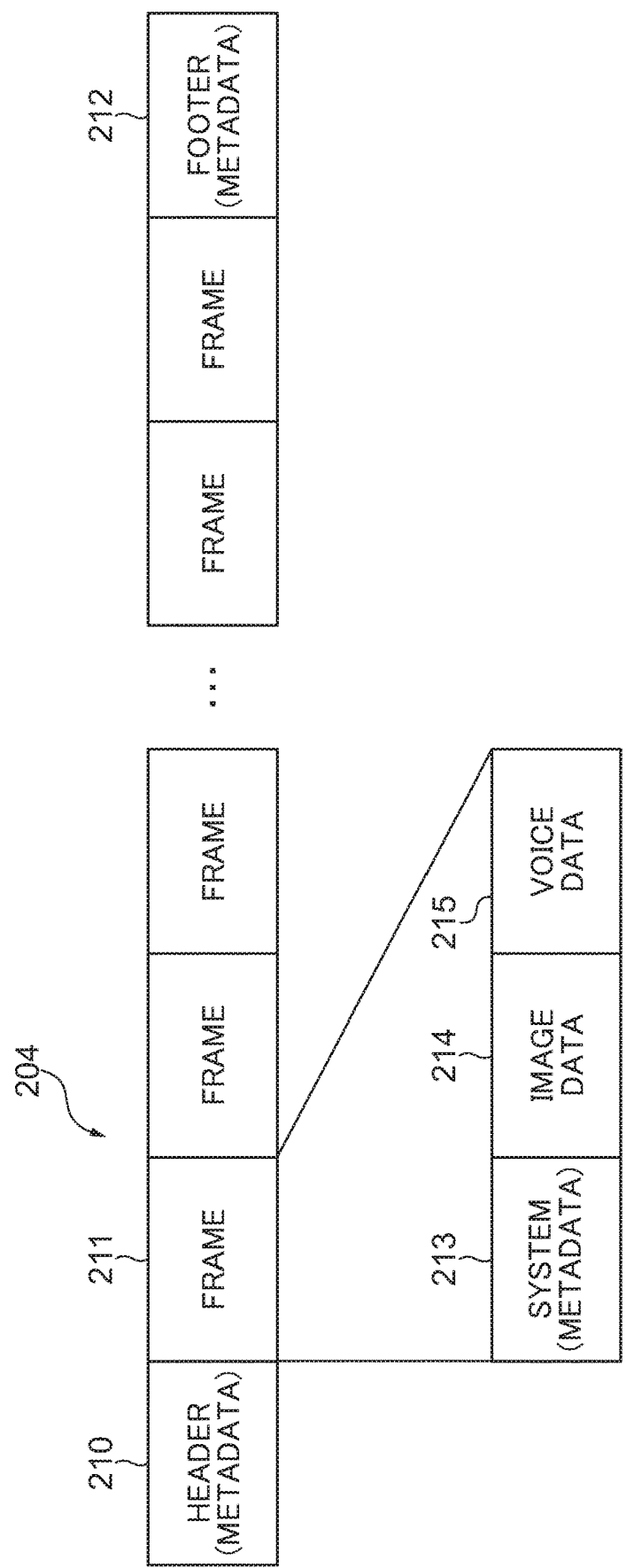

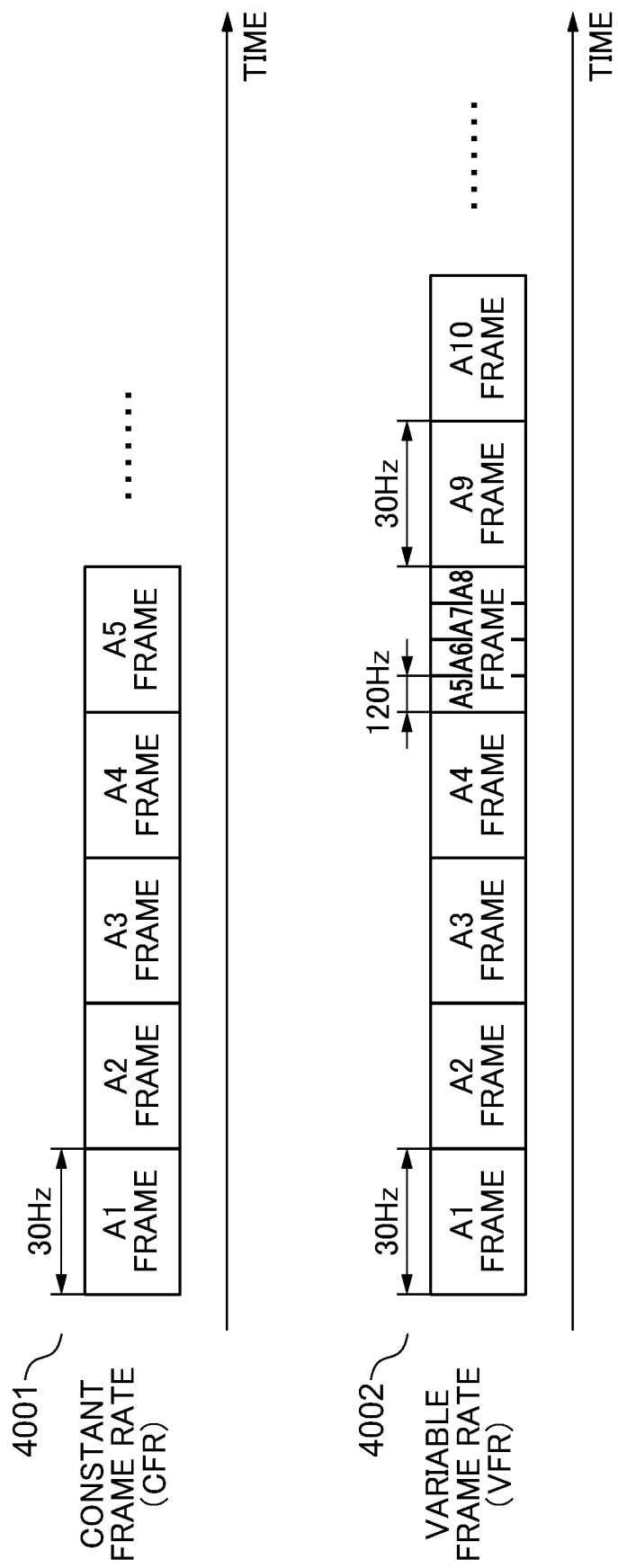

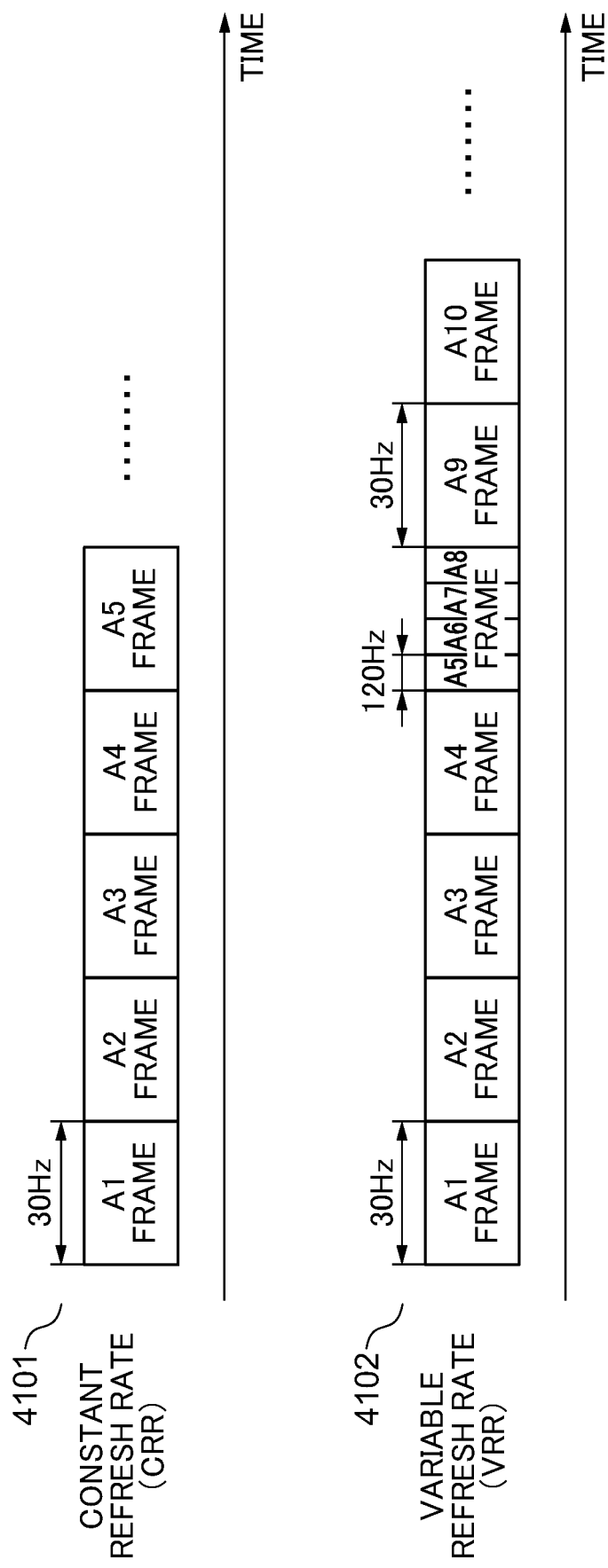

IMAGE CAPTURE APPARATUS THAT RECORDS VIDEO SIGNAL CAPTURED AT VARIABLE FRAME RATE AS MOVING IMAGE DATA, METHOD OF CONTROLLING SAME, AND STORAGE MEDIUM

BACKGROUND OF THE INVENTION

Field of the Invention

The present invention relates to an image capture apparatus that records a video signal captured at a variable frame rate, as moving image data, a method of controlling the same, and a storage medium.

Description of the Related Art

Conventionally, moving image data is generated from a video signal having 1920×1080 pixels in one frame, which is referred to as a full HD (High Definition) video signal. Further, in recent years, the video signal for generating moving image data has shifted to video signals with higher resolution, referred to as a 4K (4096×2160 pixels in one frame) video signal and a 8K (8192×4320 pixels in one frame) video signal. Further, the frame rate of the video signal has also shifted to a higher frame rate not lower than 60p, such as 120p, 240p, . . . , and 960p. Standardization adapted to the above-mentioned increases in resolution and frame rate of the video signal has been rapidly progressing. Further, although it has been possible to superimpose a time code on each frame of the video signal at up to a frame rate of 60p at maximum until now, a method of adding a time code at a frame rate of not lower than 60p was standardized as SMPTE ST 12-3 in accordance with the increase in the frame rate. Similarly, a method of increasing the refresh rate of an external output terminal, and a method of changing a refresh rate in a case where the video signal is captured at a variable frame rate (hereinafter referred to as the "VRF") was standardized in 2017 as HDMI 2.1. With this, the high-definition images have become more familiar to users.

Further, there is also a conventional technique related to a method of adding a time code in a case where a video signal captured by a video camera at a high frame rate of not lower than 60p is recorded as moving image data (see e.g. Japanese Laid-Open Patent Publication (Kokai) No. 2015-192227).

In the method of adding a time code, disclosed in Japanese Laid-Open Patent Publication (Kokai) No. 2015-192227, however, if the frame rate is changed during recording of a high-frame rate video signal as moving image data, the time code added to the moving image data deviates from the real time depending on the changing timing. That is, in a case where the video signal is a high-frame rate video signal, reproduction or outputting of the moving image data at a variable refresh rate (hereinafter referred to as the "VRR") in a VFR recording mode sometimes deviates from the real time.

SUMMARY OF THE INVENTION

The present invention provides an image capture apparatus capable of reproducing or outputting moving image data at a rate corresponding to the real time even if the frame rate is changed during recording of a time code adapted to a high frame rate, a method of controlling the same, and a storage medium.

In a first aspect of the present invention, there is provided an image capture apparatus comprising a time code generation unit configured to generate a time code to be added to each of frames of moving image data, the time code including a type including a value of sub frame for differentiating between frames at a high-frame rate, an addition unit configured to add the time code generated by the time code generation unit to each frame of the moving image data, and a control unit configured to change an image-capturing frame rate of the moving image data according to a frame rate-changing request from a user, wherein the control unit changes the image-capturing frame rate of the moving image data at a timing at which the value of sub frame of the time code becomes zero.

In a second aspect of the present invention, there is provided a method of controlling an image capture apparatus, comprising generating a time code to be added to each frame of moving image data, the time code including a type including a value of sub frame for differentiating between frames at a high-frame rate, adding the time code generated to each frame of the moving image data, and changing an image-capturing frame rate of the moving image data according to a frame rate-changing request from a user, wherein said changing includes changing the image-capturing frame rate of the moving image data at a timing at which the value of sub frame of the time code becomes zero.

In a third aspect of the present invention, there is provided a non-transitory computer-readable storage medium storing a computer-executable program for executing a method of controlling an image capture apparatus, wherein the method comprises generating a time code to be added to each frame of moving image data, the time code including a type including a value of sub frame for differentiating between frames at a high-frame rate, adding the time code generated to each frame of the moving image data, and changing an image-capturing frame rate of the moving image data according to a frame rate-changing request from a user, wherein said changing includes changing the image-capturing frame rate of the moving image data at a timing at which the value of sub frame of the time code becomes zero.

According to the present invention, it is possible to reproduce or output moving image data at a rate corresponding to the real time even if the frame rate is changed during recording of a time code adapted to a high frame rate.

Further features of the present invention will become apparent from the following description of exemplary embodiments (with reference to the attached drawings).

BRIEF DESCRIPTION OF THE DRAWINGS

FIG. 2B is a diagram showing stream configuration of the MXF format used in the first embodiment.

FIG. 4A is timing diagrams useful in explaining recording of respective video signals at a constant frame rate and a variable frame rate.

FIG. 4B is timing diagrams useful in explaining reproduction of the video signal at the variable frame rate, appearing in FIG. 4A, as moving image data at a fixed refresh rate and as moving image data at a variable refresh rate, respectively.

DESCRIPTION OF THE EMBODIMENTS

The present invention will now be described in detail below with reference to the accompanying drawings showing embodiments thereof.

In the following description, a high frame rate refers to a frame rate of not lower than 60p.

Figure 1:
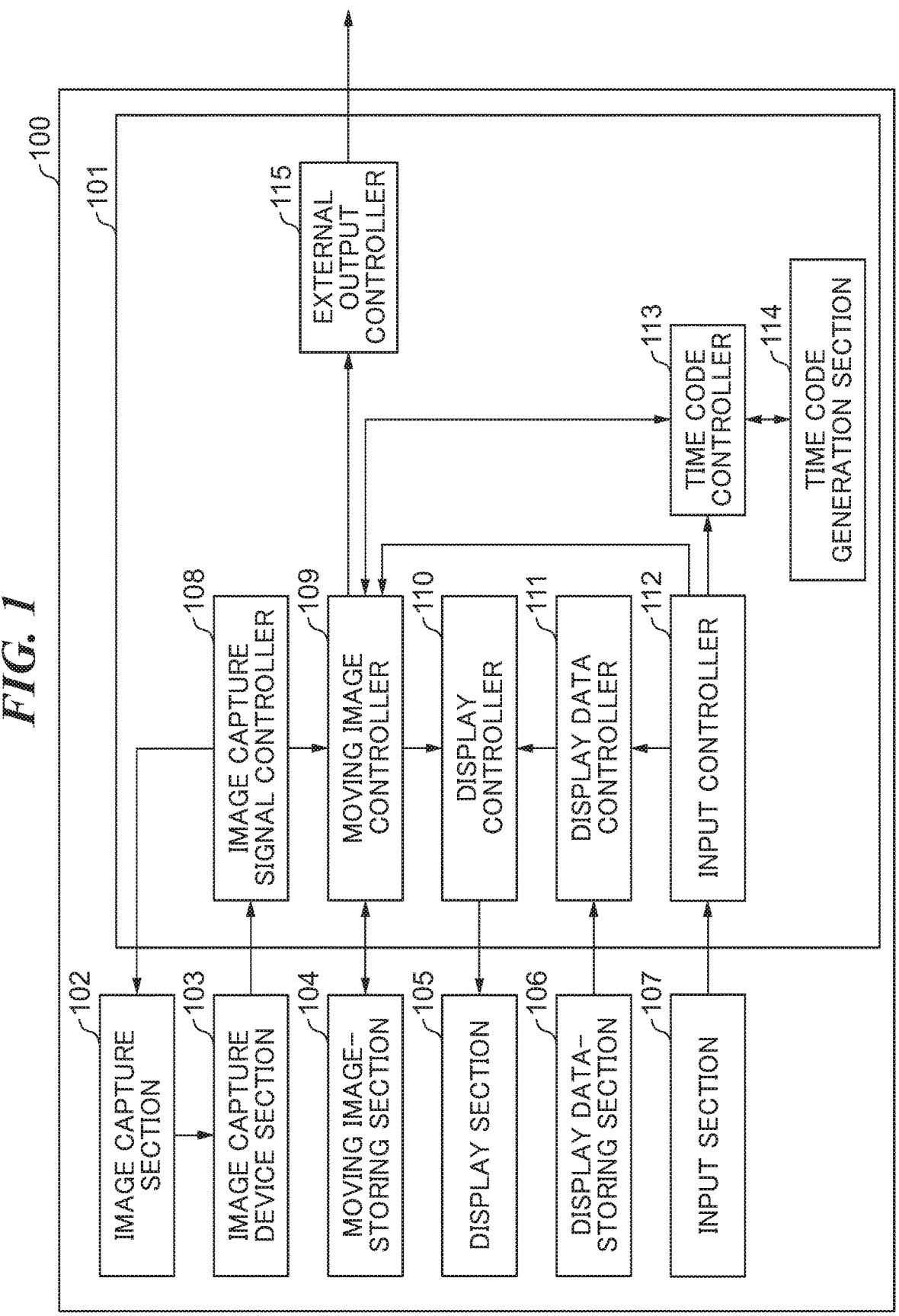
FIG. 1 is a block diagram showing a hardware configuration of an image capture apparatus according to a first embodiment.

FIG. 1 is a block diagram showing a hardware configuration of an image capture apparatus 100 according to a present embodiment.

In the present embodiment, in a case where a moving image is being captured at a high frame rate, the image capture apparatus 100 is allowed to change the frame rate only at the time of change of a frame value, thereby enabling reproduction or outputting the moving image at a variable refresh rate corresponding to the real time.

The image capture apparatus 100 includes a system controller 101 implemented by a microcomputer, an image capture section 102, an image capture device section 103, a moving image-storing section 104, a display section 105, a display data-storing section 106, and an input section 107.

The input section 107 is comprised of a jog dial, a dial switch, etc., and is capable of receiving various input operations (user instructions), performed by a user via the input section 107.

The system controller 101 includes a CPU (Central Processing Unit), a ROM (Read Only Memory), a RAM (Random Access Memory), and a system timer, none of which are shown, as hardware components. The system controller 101 is comprised of one or more processors, and executes various processes based on programs read from a program memory, not shown. The system controller 101 performs various control by executing control programs stored in the ROM, using the RAM as a work area.

Further, the system controller 101 includes an image capture signal controller 108, a moving image controller 109, a display controller 110, a display data controller 111, and an input controller 112, as software components. The system controller 101 further includes a time code controller 113, a time code generation section 114, and an external output controller 115, as software components.

The image capture section 102 includes an optical section, not shown, having a focus lens, a zoom lens, a diaphragm, a shutter, and so forth, performs proper optical processing for an optical image entering from the outside, and sends the optical image to the image capture device section 103. Further, the image capture section 102 controls the optical section having the focus lens, the zoom lens, the diaphragm, the shutter, and so forth, by receiving control signals from the image capture signal controller 108.

The image capture device section 103 performs processing for converting the optical image, on which optical processing has been performed by the image capture section 102, to electrical signals, and sends the converted electrical signals to the image capture signal controller 108. The image capture device section 103 is implemented by an image capture device, such as a CCD (Charge Coupled Device) or a CMOS (Complementary Metal Oxide Semiconductor) sensor.

The moving image-storing section 104 is a memory for holding moving image data and is implemented e.g. by an SD card.

The image capture signal controller 108 performs image processing, such as analog-to-digital conversion processing and amplification processing, on electrical signals obtained from the image capture device section 103 to thereby generate video signals. The generated video signals are different in frame rate (the number of frames per one second) depending on a recording method. In the case of an NTSC method, the frame rate is one of 120p/60p/60i/30p/24p, and in the case of a PAL method, the frame is one of 100p/50p/50i/25p. Further, the recording image size can be set to 4096×2160 pixels, 3840×2160 pixels, 2160×1080 pixels, 1920×1080 pixels, 1280×720 pixels, 1440×1080 pixels, and so forth. In the following description, it is assumed that, basically, the recording image size is set to 1920×1080 pixels, the frame rate can be changed to 120p or 30p during recording, and a video signal generated based on the above conditions is sent to the moving image controller 109. Further, the image capture signal controller 108 is capable of sending the control signals for controlling the optical section having the focus lens, the zoom lens, the diaphragm, the shutter, and so forth, to the image capture section 102.

The moving image controller 109 has a function of compressing (encoding) and expanding (decoding) the video signal. Therefore, for example, in a case where the video signal is sent from the image capture signal controller 108, the moving image controller 109 generates moving image data by compressing (encoding) the video signal, and outputs the generated moving image data to the moving image-storing section 104. Further, the moving image controller 109 requests the moving image-storing section 104, according to a user instruction sent from the input section 107 via the input controller 112, to send moving image data desired by the user. When the moving image data is sent from the moving image-storing section 104 in response to this request, the moving image controller 109 expands (decodes) the received data, and sends the decoded data to the display controller 110. With this, the moving image data is displayed on the display section 105. Further, in a case where a time code is sent from the time code controller 113, the moving image controller 109 superimposes the time code on the moving image data, and then compresses (encodes) the moving image data. With this, it is possible to output moving image data generated based on a video signal sent from the image capture signal controller 108, or moving image data sent from the moving image-storing section 104, to the external output controller 115 together with the time code.

In the present embodiment, a description will be given of a case where compressed video frames are recorded in a file format having a container structure, referred to as the MXF (Material eXchange Format) format, together with management information, such as the time code, and voice data, by way of example. However, there is no problem even when the video frames are recorded in any other file format, such as the AVCHD (Advance Video Codec High Definition) format and the MP4 (MPEG-4 Part 14 or ISO/IEC14496-14: 2003) format.

Figure 2A:
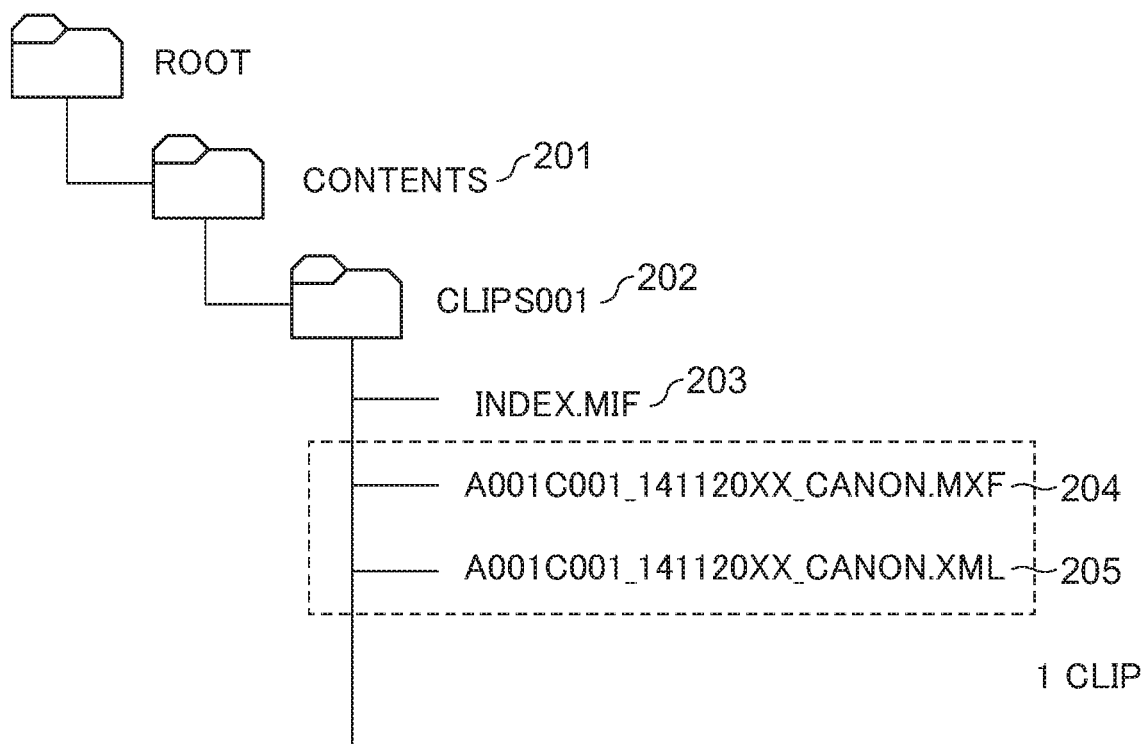
FIG. 2A is a diagram showing folder configuration of the MXF format used in the first embodiment.

FIG. 2A shows the folder configuration of MXF data recorded in the moving image-storing section 104.

When the moving image-storing section 104 is initialized according to a user instruction sent from the input section 107 via the input controller 112, a CONTENTS folder 201 and a CLIPS001 folder 202 are generated in the moving image-storing section 104.

Further, when recording of moving image data is started according to a user instruction sent from the input section 107, an MXF file 204 as a stream file and an XML file 205, in which edit information is described, are recorded in the moving image-storing section 104 as one clip. Whenever recording of moving image data is newly started, an MXF file and an XML file, to which different file names from those of the MXF file 204 and the XML file 205 are attached, are recorded in the moving image-storing section 104 as a new clip. A management file collecting information on a plurality of clips recorded in the moving image-storing section 104, into one file, is INDEX.MIF 203. With this, even in a case where the number of clips recorded in the moving image-storing section 104 increases, it is possible to analyze the information on the clips only by analyzing the INDEX.MIF 203 without analyzing the contents in the folder on a clip-by-clip basis, and hence it is possible to reduce the analysis time. Further, a frame number, a time code, etc., required to be set on a frame-by-frame basis, are recorded in the MXF file 204.

Next, FIG. 2B shows the container structure (stream configuration) of the MXF file 204.

The MXF file 204 is formed by a header 210, a plurality of frames (hereinafter referred to as frame information) 211, and a footer 212.

The header 210 indicates the start of the MXF file 204, and records meta information on the MXF file 204. Before recording image data, information on a resolution and a frame rate at which the image data is to be recorded, etc., are recorded in the area of the header 210.

A plurality of pieces of frame information 211 are each data of a frame. More specifically, the frame information 211 is composed of meta information 213, image data 214, and voice data 215 of the frame.

The footer 212 is information indicating an end of the MXF file 204.

As the frame number, a value of 0 is assigned to the start frame, and values of 1, 2, 3, . . . , are sequentially assigned to subsequent frames, respectively. Each assigned frame number is recorded in the area of the meta information 213 in the frame information 211 of a corresponding frame.

The XML file 205 is an XML (Extensible Markup Language) file described in a markup language, into which edit information can be written using tag information.

Referring again to FIG. 1, the external output controller 115 outputs moving image data sent from the moving image controller 109 to the outside. The external output controller 115 is formed by an external output terminal, such as an SDI (Serial Digital Interface) terminal or an HDMI (High-Definition Multimedia Interface) terminal.

The moving image-storing section 104 stores moving image data in a format, such as MPEG2 (Moving Picture Experts Group), H. 264, and H. 265. Further, moving image data can be written into and read from the moving image-storing section 104 according to an instruction received from the moving image controller 109.

The input controller 112 performs processing for notifying a suitable processing controller of the contents of a user input operation (instruction) received from the input section 107. The input controller 112 is capable of requesting the moving image controller 109, according to a user instruction, to start and stop recording of moving image data, and setting a recording frame rate. Further, the input controller 112 is capable of requesting the display data controller 111, according to a user instruction, to display display data desired by the user, which has been stored in the display data-storing section 106, on the display section 105. Further, the input controller 112 is capable of causing the time code controller 113, according to a user instruction, to perform time code setting control, desired by the user.

The display data controller 111 reads display data from the display data-storing section 106 according to a user instruction sent from the input section 107 via the input controller 112 and sends the display data to the display controller 110.

The display data-storing section 106 stores the display data, and the display data is read out according to an instruction received from the display data controller 111.

The display controller 110 combines the display data sent from the display data controller 111 and the video signal sent from the moving image controller 109, converts the combined data to moving image in a format which can be displayed on the display section 105, and sends the converted moving image data to the display section 105.

The display section 105 displays the moving image data sent from the display controller 110. The display section 105 is implemented by a liquid crystal screen, such as an LCD (Liquid Crystal Monitor) or an EVF (Electronic View Finder).

The moving image-storing section 104 and the display data-storing section 106 are each implemented by an HDD (Hard Disk Drive) or an optical disk, such as a DVD (Digital Versatile Disc), or a storage medium, such as a nonvolatile memory card.

Figure 3:
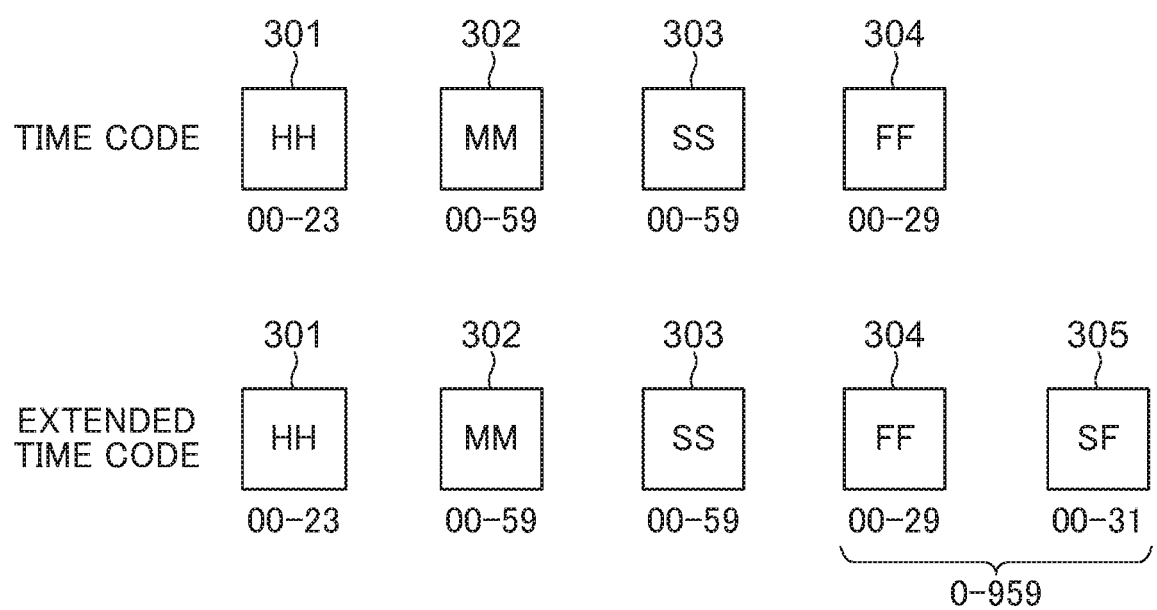
FIG. 3 is a diagram showing configuration of a conventional time code and configuration of an extended time code.

The time code generation section 114 generates a time code according to an instruction received from the time code controller 113. The time code can be generated in units of hour, minute, second, frame, and sub frame, and the number of frames per unit time varies with a set recording frame rate. The sub frame is a unit for expressing a time shorter than the frame which is one of the units of the time code, and is used in a case where an extended time code, referred to hereinafter, is used as the time code. FIG. 3 shows the conventional time code and the extended time code. Details of the set value of the time code are described in SMPTE ST 12, and hence detailed description thereof is omitted here. The set value of the conventional time code, defined in SMPTE ST 12-1 and SMPTE ST 12-2 is expressed in units of hour 301 from 00 to 23, minute 302 from 00 to 59, second 303 from 00 to 59, and frame 304 from 00 to 29. However, when the frame rate is increased e.g. to 120p, the frames cannot be distinguished based on SMPTE ST 12-1 or SMPTE ST 12-2, and this causes a situation in which there are a plurality of frames having the same set value of the time code. To prevent this, in a case where a moving image is recorded at a high frame rate, the extended time code defined by SMPTE ST 12-3 is used as the time code to identify frames at the high frame rate. With this, the set value of the time code can be expressed not only in units of hour 301, minute 302, second 303, and frame 304, but also in units of sub frame 305 from 00 to 31. That is, by using frame 304 and sub frame 305, it is possible to add different set values of the time code to the frames of 960p from 0 to 959, for identification of each frame.

Referring again to FIG. 1, the time code controller 113 reads a time code generated by the time code generation section 114 and sends the time code to the moving image controller 109. Further, the time code controller 113 sends a time code to the time code generation section 114 according to a user instruction sent from the input section 107 via the input controller 112.

The frame rate of the video signal recorded by the moving image-storing section 104 as moving image data will be described with reference to FIG. 4A.

A timing diagram 4001 shows a sequence of frames of a video signal at a constant frame rate (hereinafter referred to as CFR). The video signal is recorded at a frame rate fixed to 30p in the order of an A1 frame, an A2 frame, and so on.

A timing diagram 4002 shows a sequence of frames of the video signal at a variable frame rate (hereinafter referred to as VFR). The video signal is recorded at 30p from an A1 frame to an A4 frame, at 120p from an A5 frame to an A8, and at 30p in an A9 frame, an A10 frame, and so on.

The refresh rate used in a case where moving image data stored in the moving image-storing section 104 is read out (reproduced) and in a case where the video signal generated by the image capture signal controller 108 is directly output to the display section 105 or the external output controller 115 will be described with reference to FIG. 4B.

A timing diagram 4101 shows a sequence of frames of the video signal in the timing diagram 4002 shown in FIG. 4A, which are recorded in the moving image-storing section 104, as moving image data at a constant refresh rate of 30p. The term "constant refresh rate" is hereinafter referred to as CRR which is an acronym thereof.

A timing diagram 4102 shows a sequence of frames of the video signal in the timing diagram 4002 shown in FIG. 4A, which are recorded in the moving image-storing section 104 as moving image data at a variable refresh rate. The term "variable refresh rate" is hereinafter described as VRR which is an acronym thereof. Here, the video signal is output at a refresh rate of 30p from an A1 frame to an A4 frame, at at a refresh rate of 120p from an A5 frame to an A8 frame, and at a refresh rate of 30p in an A9 frame, an A10 frame, and so on.

Figure 4C:
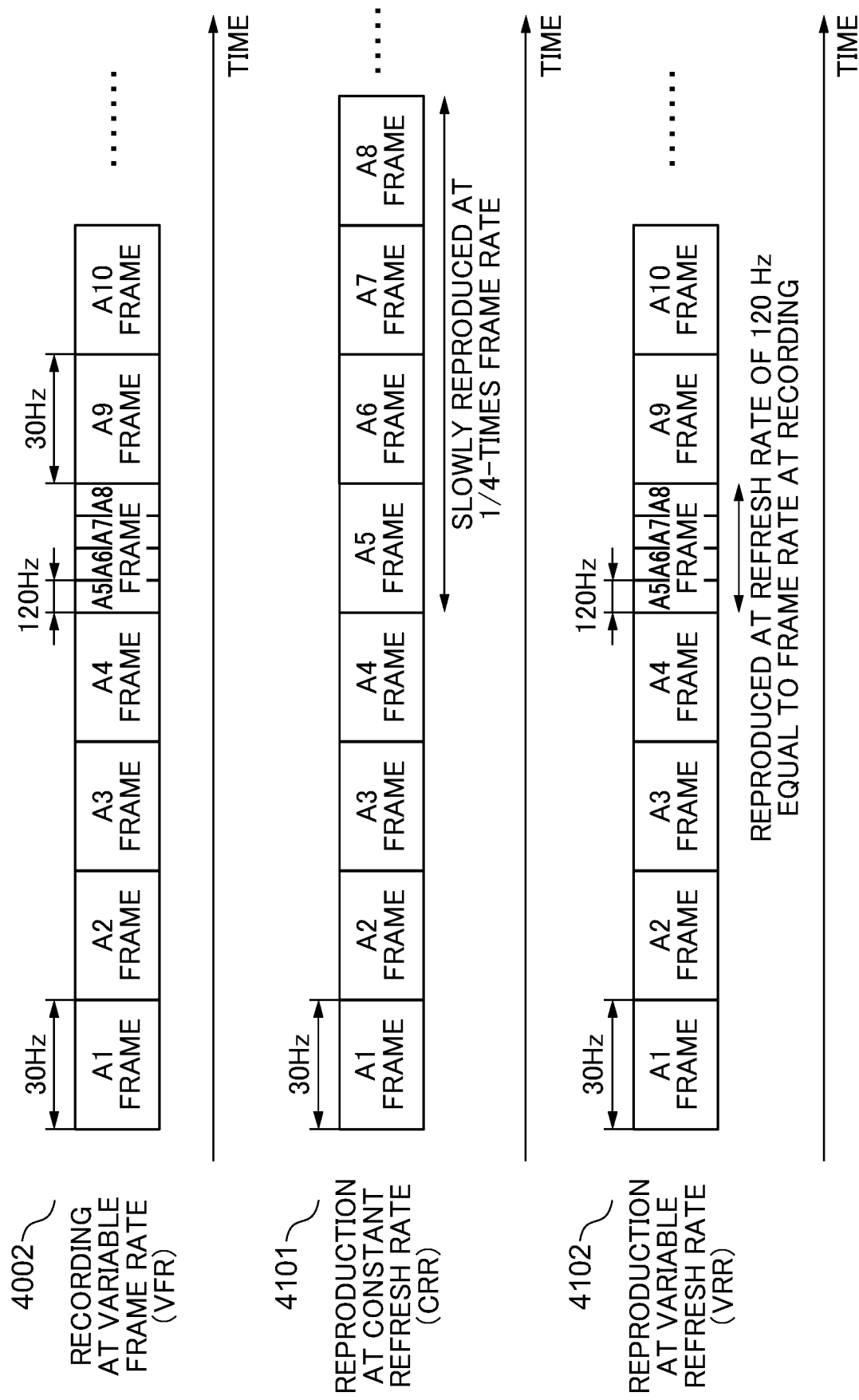
FIG. 4C is timing diagrams useful in comparing between recording of the video signal at the variable frame rate, described with reference to FIG. 4A, and reproduction of the moving image data at the fixed refresh rate and the moving image data at the variable refresh rate, described with reference to FIG. 4B.

In this case, as shown in FIG. 4C, the A5 to A8 frames in the timing diagram 4002 are frames of the video signal at the frame rate of 120p. However, as shown in the timing diagram 4101, in a case where the video signal is recorded as the moving image data at CRR, these frames are read out (reproduced) at the frame rate of 30p, and hence slow reproduction is performed at ¼ times the frame rate of the video signal. On the other hand, as shown in the timing diagram 4102, in a case where the video signal is recorded as the moving image data at VRR, these frames are read out (reproduced) at the frame rate of 120p, and hence reproduction is performed at the same rate as that of of the video signal.

For this reason, it is necessary to change the control of the time code in recording the video signal depending on whether the moving image data obtained by encoding VFR video signal is to be read out at CRR or VRR to the display section 105 or the external output controller 115. In a case where the moving image data is read out at CRR, the control for converting time codes of all frames recorded at VFR into time codes adapted to the frame rate of 30p is performed. By thus controlling the time codes, when reproducing the moving image data at CRR, part of the moving image data, in which frames of the video signal at the frame rate of 120p are encoded, is slowly reproduced at ¼-times the frame rate. Similarly, in a case where the moving image data is read out at VRR, the control for reproducing the same by taking into account sub frame of time codes of all frames recorded at VFR. By thus controlling the time codes, when reproducing the moving image data at VRR, part of the moving image data, in which the frames of the video signal at the frame rate of 120p are encoded, is reproduced at the same frame rate of 120p as used in recording.

In the present embodiment, in a case where moving image data generated by encoding the video signal at VFR is read out at VRR, a process for changing the frame rate of the video signal is performed only at a timing at which a value of frame of the time code is changed by incrementing the value when the moving image data is recorded. Details of this frame rate-changing process will be described with reference to a flowchart in FIG. 5.

Figure 5:
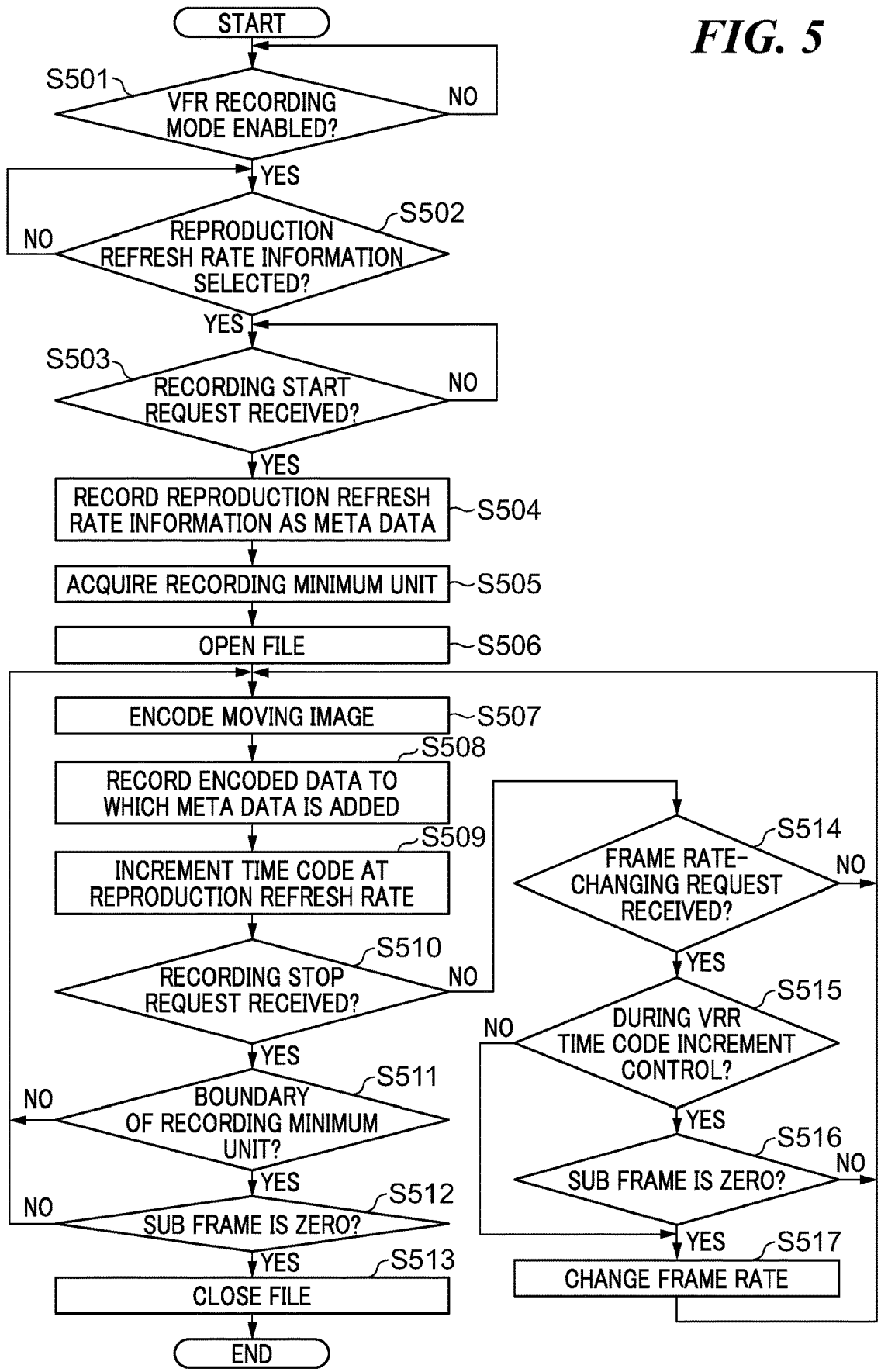
FIG. 5 is a flowchart of a frame rate-changing process according to the first embodiment, which is performed by the image capture apparatus shown in FIG. 1.

FIG. 5 is the flowchart of the frame rate-changing process according to the present embodiment, performed by the image capture apparatus 100. The present process is performed by the system controller 101 executing a program read from the program memory, in a state in which the image capture apparatus 100 is powered on and started up.

In a step S501, the input controller 112 determines whether or not a VFR recording mode has been enabled by a user operation input to the input section 107 on a UI (user interface) display, described hereinafter with reference to FIG. 7A. If the VFR recording mode has been enabled (YES to the step S501), the process proceeds to a step S502. If the VFR recording mode has not been enabled (NO to the step S501), the present process is not executed. Therefore, the process returns to the step S501, and when the VFR recording mode is enabled, the step S502 et seq. are executed.

In the step S502, the input controller 112 determines whether or not refresh rate information for reproduction (hereinafter referred to as the "reproduction refresh rate information") has been selected by a user operation on the input section 107 of a UI display described hereinafter with reference to FIG. 7B. Note that in the present embodiment, one of CRR and VRR is selected as the reproduction refresh rate information. If the reproduction refresh rate information has been selected (YES to the step S502), the process proceeds to a step S503. If the reproduction refresh rate information has not been selected (NO to the step S502), the process returns to the step S502. If CRR has been selected as the reproduction refresh rate information in the step S502, the input controller 112 instructs the time code controller 113 to perform control for incrementing the time code without taking sub frame into account. On the other hand, if VRR has been selected as the reproduction refresh rate information in the step S502, the input controller 112 instructs the time code controller 113 to perform control for incrementing the time code by taking sub frame into account.

In the step S503, the input controller 112 determines whether or not a user instruction for requesting the start of recording of moving image data has been input to the input section 107. If the recording start request has been input (YES to the step S503), the process proceeds to a step S504. If the recording start request has not been input (NO to the step S503), the process returns to the step S503.

Note that in a case where the recording start request has not been input in the step S503, i.e. even in a case where moving image data is not being recorded, the input controller 112 may also determine whether or not a user instruction for requesting changing of the frame rate is input to the input section 107. In a case where the frame rate-changing request is input when moving image data is not being recorded, the frame rate is changed at a time when the frame rate-changing request is received, since the time code is not being recorded. Further, a user instruction for changing the reproduction refresh rate information may be made acceptable when moving image data is not being recorded, and the input controller 112 may determine whether or not a user instruction for changing the reproduction refresh rate information has been input to the input section 107. If a user instruction for changing the reproduction refresh rate information has been input, the input controller 112 instructs the time code controller 113 to perform control according to the changed reproduction refresh rate information.

In the step S504, the input controller 112 instructs the moving image controller 109 to record the reproduction refresh rate information, selected in the step S502, in the moving image-storing section 104 as meta data, and then the process proceeds to a step S505. In a case where the moving image-storing section 104 records the moving image data in the MXF file format, the reproduction refresh rate information is recorded in the INDEX.MIF 203 in FIG. 2A.

In the step S505, the moving image controller 109 acquires the number of frames in GOP (Group Of Picture) as the recording minimum unit, and then the process proceeds to a step S506. For example, in a case where the recording start request has been input in the step S503, since the default frame rate at the start of recording is 30p, the GOP's frames number, i.e. the number of frames per one GOP of the moving image data to be reproduced is 15. In this case, even when a recording stop request is received from the user, recording of the moving image data is not stopped until the frame number reaches an integer multiple of 15.

In the step S506, the input controller 112 instructs the moving image controller 109 to open a moving image file, and then the process proceeds to a step S507.

In the step S507, the moving image controller 109 compresses (encodes) one frame of the video signal from the image capture signal controller 108, to generate moving image data (encoded data) according to the instruction received from the input controller 112 in the step S506, and then the process proceeds to a step S508. At this time, the input controller 112 instructs the time code controller 113 to send a time code to the moving image controller 109. When the time code controller 113 sends a time code to the moving image controller 109 in response to this instruction from the input controller 112, the process proceeds to a step S509.

In the step S508, the moving image controller 109, first, adds meta data to the moving image data of one frame generated in the step S507. This meta data includes the time code sent from the time code controller 113 in response to the instruction from the input controller 112 in the step S507. After that, the moving image controller 109 stores the moving image data to which the meta data including the time code has been added, in the moving image-storing section 104, and then, the process proceeds to the step S509. This step S508 is executed whenever moving image data is generated from one frame of the video signal in the step S507. That is, in a case where the recording start request has been input from a user in the step S503, the moving image controller 109 performs, whenever moving image data is generated from one frame of the video signal, the control for superimposing (adding) the time code to the moving image data, and recording the moving image data including the time code in the moving image-storing section 104.

In the step S509, the time code controller 113 instructs the time code generation section 114 to increment the time code according to the refresh rate information selected in the step S502, and then the process proceeds to a step S510. That is, the time code generation section 114 increments the time code at CRR or VRR, selected in the step S502, whenever the time code is sent to the moving image controller 109, i.e. whenever the time code is superimposed on the moving image data.

In the step S510, the input controller 112 determines whether or not a user instruction for requesting to stop recording has been input to the input section 107. If the recording stop request has been input (YES to the step S510), the process proceeds to a step S511. If the recording stop request has not been input (NO to the step S510), the process proceeds to a step S514.

In the step S511, the input controller 112, first, requests the moving image controller 109 to send the frame number included in the meta data sent to the moving image-storing section 104 in the step S508. Then, the input controller 112 determines whether or not the moving image data recorded in the moving image-storing section 104 has reached a frame of which the frame number is an integer multiple of the GOP's frames number, acquired in the step S505 (boundary of the recording minimum unit), based on the frame number sent from the moving image controller 109 in response to the request. If the moving image data has reached a frame of which the frame number is an integer multiple of the GOP's frames number (YES to the step S511), the process proceeds to a step S512. If the moving image data has not reached a frame of which the frame number is an integer multiple of the GOP's frames number (NO to the step S511), the process returns to the step S507. In spite of receipt of the recording stop request, in a case where the answer to the question of the step S511 is negative (NO) or the answer to the question of the step S512 is negative (NO), it continues to be determined that the recording stop request has been received, until recording stop processing is executed. That is, after receipt of the recording stop request, it is determined that the answer to the question of the step S510 is positive (YES), and the steps S507 to S509 are repeated until it is determined that the answer to the question of the step S511 is positive (YES) and the answer to the question of the step S512 is positive (YES), causing a step S513 to be executed.

In the step S512, the input controller 112, first, requests the time code controller 113 to send a value of the time code incremented in the step S509. Then, the input controller 112 determines, based on the value of the time code sent from the time code controller 113 in response to this request, whether or not the value of sub frame of the time code is zero. This determination is performed to eliminate a problem which is caused when the process proceeds to the step S513 without performing this determination to close the file, in a case where, for example, a series of moving image data is recorded in a state divided into a plurality of files. That is, in such a case, if this determination is not performed, one of the divided files, which is to be recorded next, sometimes starts with a first frame of moving image data, where the value of sub frame of the time code is not zero. In this case, a problem is caused that the compatibility with the conventional time code, not using units of sub frame, is lost. Therefore, in the present embodiment, the process proceeds to the step S513, and the file is closed only in a case where it is determined in the step S512 that the value of sub frame is zero, i.e. only at a timing at which the value of frame 304 of the time code is changed. On the other hand, if it is determined in the step S512 that the value of sub frame is not zero, the process returns to the step S507. Note that in the case where the value of sub frame is not zero, the configuration may be such that the value of frame of the time code is incremented to thereby set the value of sub frame to zero, and then the process proceeds to the step S513. Further, the timing of closing the file may be changed between a case where file-dividing recording for recording a series of moving image data in a state divided into a plurality of files is executed, and a case where file-dividing recording is not executed. For example, in the case where file-dividing recording is executed, the file is closed at a timing at which the value of sub frame of the next frame becomes zero, whereby the moving image data is divided and recorded in a plurality of files at a timing at which the value of frame 304 of the time code is changed. On the other hand, in the case where file-dividing recording is not performed, it is only required that the file is closed regardless of the value of sub frame. It is only required that these processes are switched according to whether or not conditions of executing file-dividing recording are satisfied.

In the step S513, the input controller 112 instructs the moving image controller 109 to close the moving image file, followed by terminating the present process.

In the step S514, the input controller 112 determines whether or not a user instruction for requesting changing of the frame rate has been input to the input section 107. If the frame rate-changing request has been input (YES to the step S514), the input controller 112 displays a UI display described hereinafter with reference to FIG. 7C, and after the user selects a frame rate for changing, the process proceeds to a step S515. If the frame rate-changing request has not been input (NO to the step S514), the process returns to the step S507.

In the step S515, the input controller 112 determines whether or not VRR has been selected as the reproduction refresh rate in the step S502. That is, the input controller 112 determines whether or not the time code controller 113 is performing the control for incrementing the time code by taking sub frame into account (hereinafter referred to as the "VRR time code increment control"). If the time code controller 113 is performing VRR time code increment control (YES to the step S515), the process proceeds to a step S516. On the other hand, if the time code controller 113 is performing not the VRR time code increment control but CRR time code increment control (NO to the step S515), the process proceeds to a step S517, wherein the input controller 112 changes the frame rate in the timing of receipt of the frame rate-changing request.

In the step S516, the input controller 112, first, requests the time code controller 113 to send the value of the time code incremented in the step S509. After that, the input controller 112 determines, based on the value of the time code sent from the time code controller 113 in response to this request, whether or not the value of sub frame of the time code is zero. That is, the input controller 112 determines whether or not it is the timing at which the value of sub frame of the time code to be added to the next frame becomes zero and the value of frame 304 of the time code is to be changed. Details will be described hereinafter with reference to a timing diagram in FIG. 6. If the value of sub frame of the time code to be added to the next frame is zero (YES to the step S516), the process proceeds to the step S517. If the value of sub frame of the time code is not zero (NO to the step S516), the process returns to the step S507. Note that differently from the step S512, in the step S516, in a case where the value of sub frame is not zero, the process is not allowed to proceed to the step S517 after incrementing the value of frame of the time code and setting the value of sub frame to zero, because this makes the moving image data impossible to be reproduced or output at a variable refresh rate corresponding to the real time. In a case where the answer to the question of the step S516 is negative (NO) in spite of receipt of a user instruction for requesting changing of the frame rate, it continues to be determined in the step S514 that the user instruction for requesting changing of the frame rate has been received until the frame rate is changed in the step S517. That is, in a case where although the user instruction for requesting changing of the frame rate has been received, the value of sub frame of the time code of the next frame does not become zero, the process from the step S507 is repeated. After that, when the value of sub frame of the time code of the next frame becomes zero and it is the timing to change the value of frame 304 of the time code, the process proceeds to the step S517.

In the step S517, the input controller 112 requests the image capture signal controller 108 to change the frame rate. With this, it is possible to change the frame rate of the video signal generated by the image capture signal controller 108, from 30p to 120p or from 120p to 30p according to the frame rate-changing request received in the step S514. That is, the frame rate is to be changed from a frame of the video signal (moving image data) to be acquired next in the step S507. Therefore, in a case where it is determined in the step S516 that the value of sub frame is zero and the frame rate is changed in the step S517, the frame rate is thus changed at a timing at which the value of sub frame becomes zero. After that, the process returns to the step S507.

Note that the frame rate-changing request received in the step S514 may be discriminated, and the process may be changed according to which frame rate is to be changed to which frame rate. In this case, if it is determined that the received request is a request for changing the frame rate from a low frame rate of 30 fps to a high frame rate, such as 120 fps, the process may directly proceed from the step S514 to the step S517 regardless of the value of sub frame without performing the determination in the step S515. On the other hand, if it is determined that the received request is a request for changing the frame rate from a high frame rate, such as 120 fps, to a low frame rate of 30 fps, it is only required that the process proceeds to the step S515. In a case where the frame rate is changed from a low frame rate, in which the value of sub frame is always zero, to a high frame rate, the frame rate is changed from the next frame, i.e. a frame at which the value of sub frame becomes zero, even during the VRR time code increment control. Therefore, the reproduction time or the outputting time of the moving image data does not deviate from the real time. The following description is given of a case where the high frame rate is set to 120 fps by way of example, but any other frame rate, such as 240 fps, can be set. Further, the frame rate may be changed from 120 fps to 240 fps, or from 240 fps to 120 fps. In this case, to prevent the reproduction time or the outputting time of moving image data from deviating from the real time, it is only required that the determination in the step S515 is performed and the frame rate is changed at a timing at which the value of sub frame becomes zero.

Figure 6:
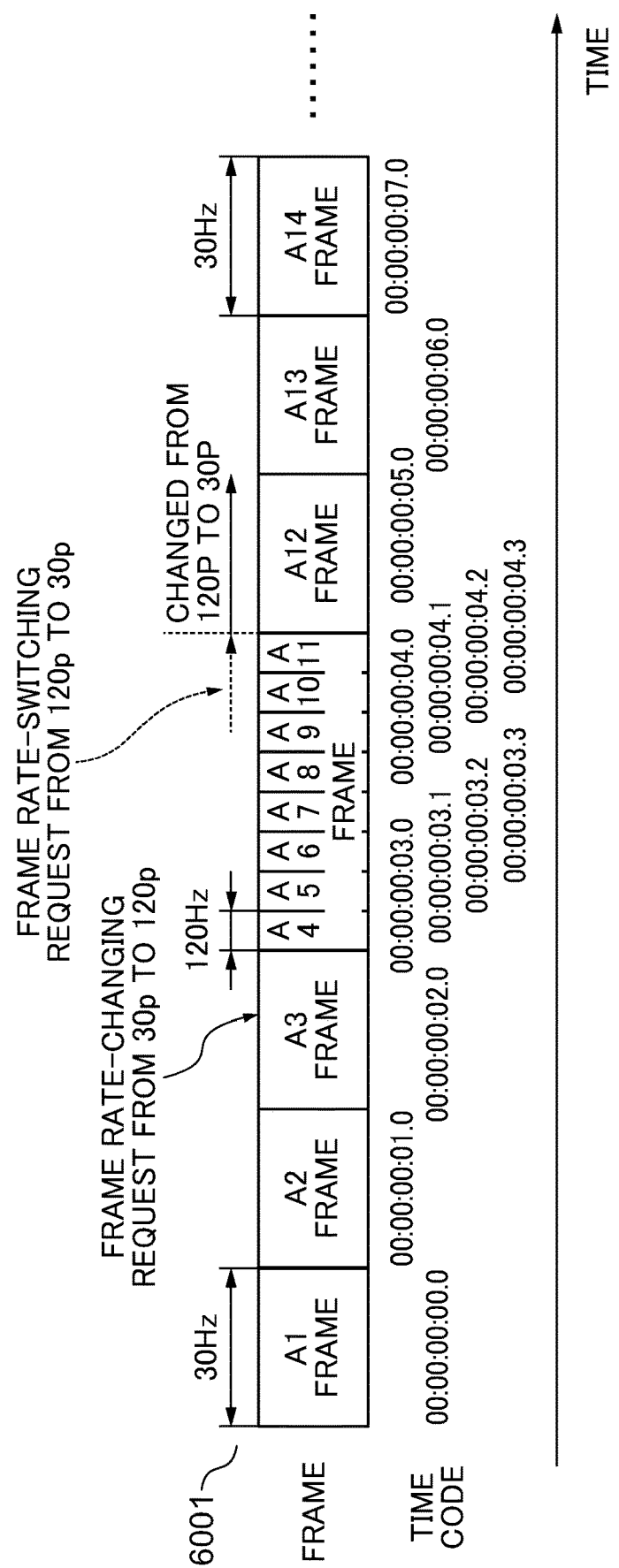
FIG. 6 is a timing diagram useful in explaining the frame rate-changing process in FIG. 5.

FIG. 6 is a timing diagram 6001 useful in explaining the frame rate-changing process in FIG. 5.

Here, a description will be given of a case where the VFR recording mode has been enabled in the step S501 in FIG. 5, VRR has been selected as the reproduction refresh rate information in the step S502, and then a request for starting recording of moving image data is received from a user in the step S503. Further, a description will be given of a case where a request for changing the frame rate from the default frame rate of 30p, set at the start of recording, to 120p is received during recording of the moving image data, and further, after that, a request for changing the frame rate from 120p to 30p is received.

As shown in FIG. 6, the moving image data is recorded at the frame rate of 30p from an A1 frame to an A3 frame. Further, since VRR has been selected as the reproduction refresh rate information, the time code increment control is performed by taking sub frame into account. Therefore, the value of the time code of each frame is described in the order of hour, minute, second, frame, and sub frame. More specifically, the value of the time code of the A1 frame indicates 00:00:00:00.0, and since the A2 and A3 frames have been recorded at 30p, the respective values of the time codes indicate 00:00:00:01.0 and 00:00:00:02.0.

If a request for changing the frame rate from 30p to 120 has been received from a user at the timing of the A3 frame (YES to the step S514), the frame rate of the video signal is changed to 120p from the next A4 frame (step S517). This is because, since the frame rate of the video signal up to the A3 frame is 30p, the value of sub frame of the VRR time code of the A4 frame becomes zero regardless of whether or not to change the frame rate of the video signal from the A4 frame.

As shown in FIG. 6, after that, the moving image data is recorded at the frame rate of 120p from the A4 frame to an A11 frame. Further, since the current frame rate is a high frame rate, the sub frame is also used for each value of the time code of these frames. More specifically, the time code is sequentially incremented such that the value of the time code of the A4 frame is 00:00:00:03.0, the value of the time code of the A5 frame is 00:00:00:03.1, and so on.

In this case, if a request for changing the frame rate from 120p to 30p has been received at the timing of the A9 frame (YES to the step S514), the frame rate of the video signal is not changed to 30p in the next A10 frame. This is because if the frame rate of the video signal is changed from 120p to 30p from the A10 frame, the VRR time code is changed from 00:00:00:04.1 in the A9 frame to 00:00:00:05.0 in the A10 frame. That is, reproduction at VRR deviates from the real time. To avoid this, in the present embodiment, in a case where a request for changing the frame rate from 120p to 30p has been received at the timing of the A9 frame, whether or not the value of sub frame of the VRR time code, incremented in the step S509, is zero is determined. In the illustrated example in FIG. 6, the value of sub frame of the VRR time code, which is incremented when the moving image data of the A11 frame is recorded, becomes zero. Therefore, the frame rate is changed from the next A12 frame. This makes it possible to reproduce the moving image data at VRR corresponding to the real time.

As shown in FIG. 6, after that, the moving image data is recorded at the frame rate of 30p from an A12 frame to an A14 frame. Therefore, the values of sub frame of the time code of these frames become zero.

Note that the frame rate may be changed without considering the value of sub frame, depending on the operation contents of a frame rate-changing request input by a user on the input section 107. However, in this case, reproduction at VRR corresponding to the real time cannot be secured.

Next, the UI display displayed for a user to select ON/OFF of the VFR recording mode, select the reproduction refresh rate information, and change the frame rate during recording of moving image data, using the input section 107, will be described with reference to FIGS. 7A to 7D. Note that the display controller 110 is capable of superimposing OSD display (display data) on the video signal sent from the moving image controller 109, for output as moving image data on the display section 105.

Figure 7A:
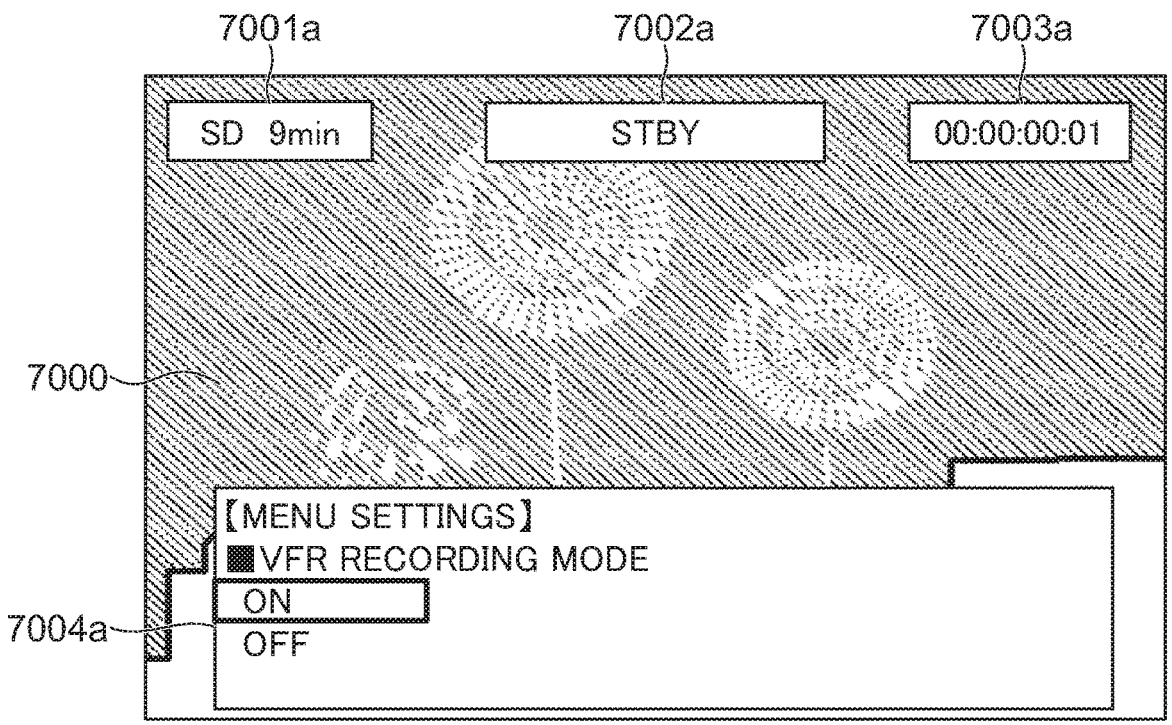
FIG. 7A is a view showing an example of a UI (user interface) display of the image capture apparatus according to the first embodiment.

FIG. 7A shows the UI display of the VFR recording mode-setting screen.

The VFR recording mode-setting screen has a moving image-displaying section 7000, a remaining recording time-displaying section 7001, an operation status-displaying section 7002, a time code-displaying section 7003, and a menu setting-displaying section 7004. Note that, in the displayed example, the reference numerals 7001, 7002, 7003, and 7004 each have a suffix added thereto which corresponds to displayed contents.

The moving image-displaying section 7000 is a display section for displaying a moving image based on the video signal sent from the moving image controller 109. On the moving image-displaying section 7000, the remaining recording time-displaying section 7001, the operation status-displaying section 7002, the time code-displaying section 7003, and the menu setting-displaying section 7004 are superimposed as the OSD display.

The remaining recording time-displaying section 7001 is a display section for displaying a remaining time for which moving image data can be recorded in the moving image-storing section 104. For example, a remaining recording time-displaying section 7001a, appearing in FIG. 7A, displays "SD 9 min" indicating that an SD card is used as the moving image-storing section 104, and its recordable remaining time is 9 minutes.

The operation status-displaying section 7002 is a display section for indicating the operation status of the image capture apparatus 100. For example, in a case where a solid circle is additionally displayed as in an operation status-displaying section 7002*c*, referred to hereinafter, in FIG. 7C, it indicates that moving image data is being recorded in the image capture apparatus 100 at present. On the other hand, in a case where the solid circle is not displayed as in an operation status-displaying section 7002*a*, appearing in FIG. 7A, moving image data is not being recorded in the image capture apparatus 100 at present.

The time code-displaying section 7003 is a display section for indicating a value of the time code generated by the time code generation section 114. For example, the value of the time code is displayed in a time code-displaying section 7003*a*, appearing in FIG. 7A, as 00:00:00:01 based on the default frame rate of 30p.

The menu setting-displaying section 7004 is a display section for setting various menus options according to a user operation input to the input section 107. For example, a menu setting-displaying section 7004*a*, appearing in FIG. 7A, displays a screen for selecting whether the VFR recording mode is to be set to ON (enabled) or OFF (disabled). As shown in FIG. 7A, in the present example, the VFR recording mode is selected to be set to ON.

Figure 7B:
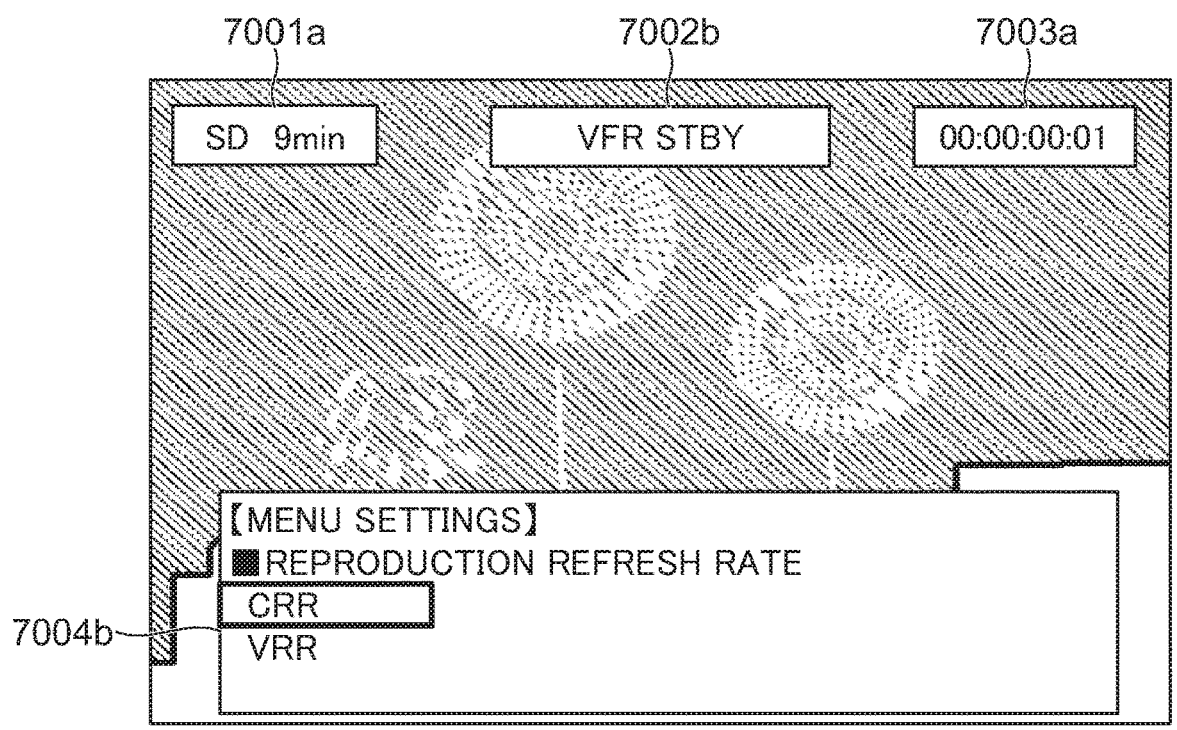
FIG. 7B is a view showing an example of the UI display of the image capture apparatus according to the first embodiment.

FIG. 7B shows the UI display of a reproduction refresh rate information-setting screen. The same components in FIG. 7B as those in FIG. 7A are denoted by the same reference numerals, and description thereof is omitted.

In a case where the VFR recording mode is set to ON in the menu setting-displaying section 7004*a*, appearing in FIG. 7A, the operation status of the image capture apparatus 100 is a recording standby state in the VFR recording mode. Therefore, an operation status-displaying section 7002*b*, appearing in FIG. 7B, displays "VFR STBY" indicating this fact.

Further, a menu setting-displaying section 7004*b*, appearing in FIG. 7B, displays a screen for selecting CRR or VRR as the reproduction refresh rate information.

Figure 7C:
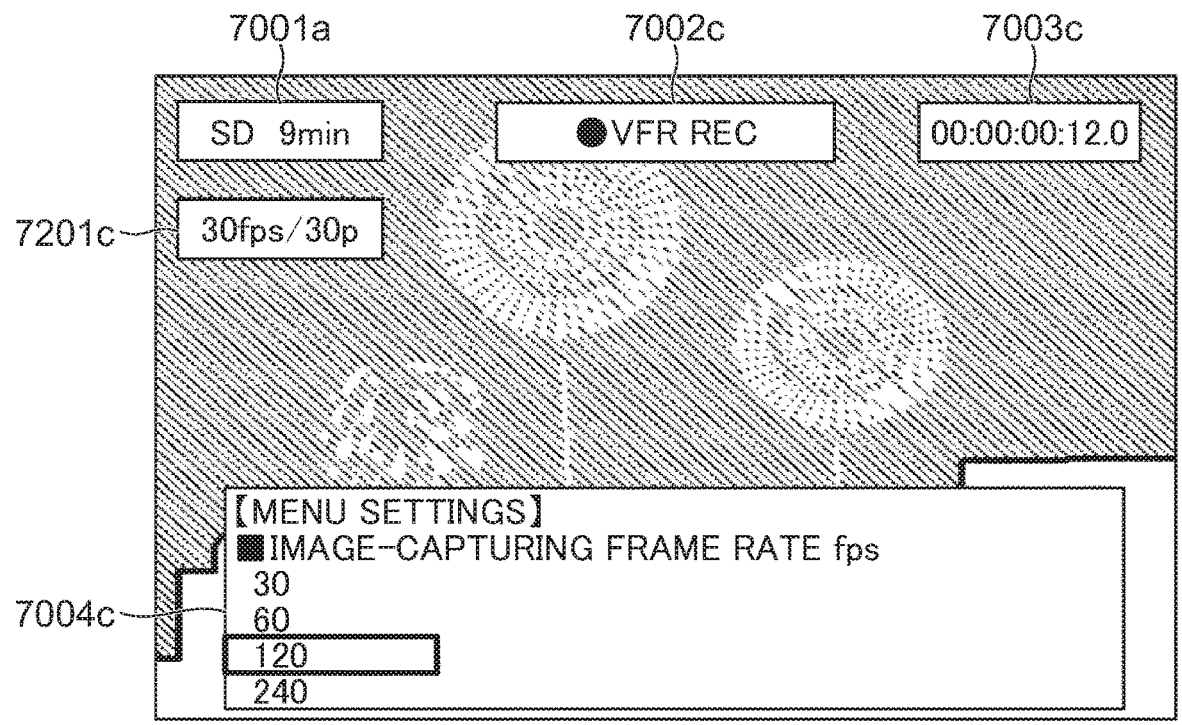
FIG. 7C is a view showing an example of the UI display of the image capture apparatus according to the first embodiment.

FIG. 7C shows the UI display of a frame rate-setting screen, displayed when a user instruction for requesting changing of the frame rate is input to the input section 107 during recording of moving image data at VFR.

Similar to the screen shown in FIG. 7A, the frame rate-setting screen has, not only the moving image-displaying section 7000, the remaining recording time-displaying section 7001, the operation status-displaying section 7002, the time code-displaying section 7003, and the menu setting-displaying section 7004, but also a real-time displaying section 7201. Note that, in the displayed example, the reference numeral 7201 has a suffix added thereto which corresponds to displayed contents.

In a case where the operation status of the image capture apparatus 100 is a state in which moving image data is being recorded at VFR, the operation status-displaying section 7002*c*, appearing in FIG. 7C, displays VFR REC with the solid circle, indicating this fact.

Further, as indicated in a time code-displaying section 7003*c*, since VFR recording has been started, the time code advances. The moving image data generated by encoding the video signal at the frame rate of 30p is being recorded and the reproduction refresh rate information has been set to VRR. Therefore, the time code is displayed in the time code-displaying section 7003*c*, appearing in FIG. 7C, as 00:00:00:12.0, for example.

A real-time displaying section 7201*c* displays the frame rate (fps) of the video signal recorded as moving image data and the refresh rate (p) of the moving image data, for expression of the real time. In the present example, since the frame rate of the moving image data being recorded is 30p, and the reproduction refresh rate information is set to VRR, the real-time displaying section 7201 displays "30 fps/30p", for expression of the real time.

A menu setting-displaying section 7004*c* displays a frame rate selection screen.

Figure 7D:
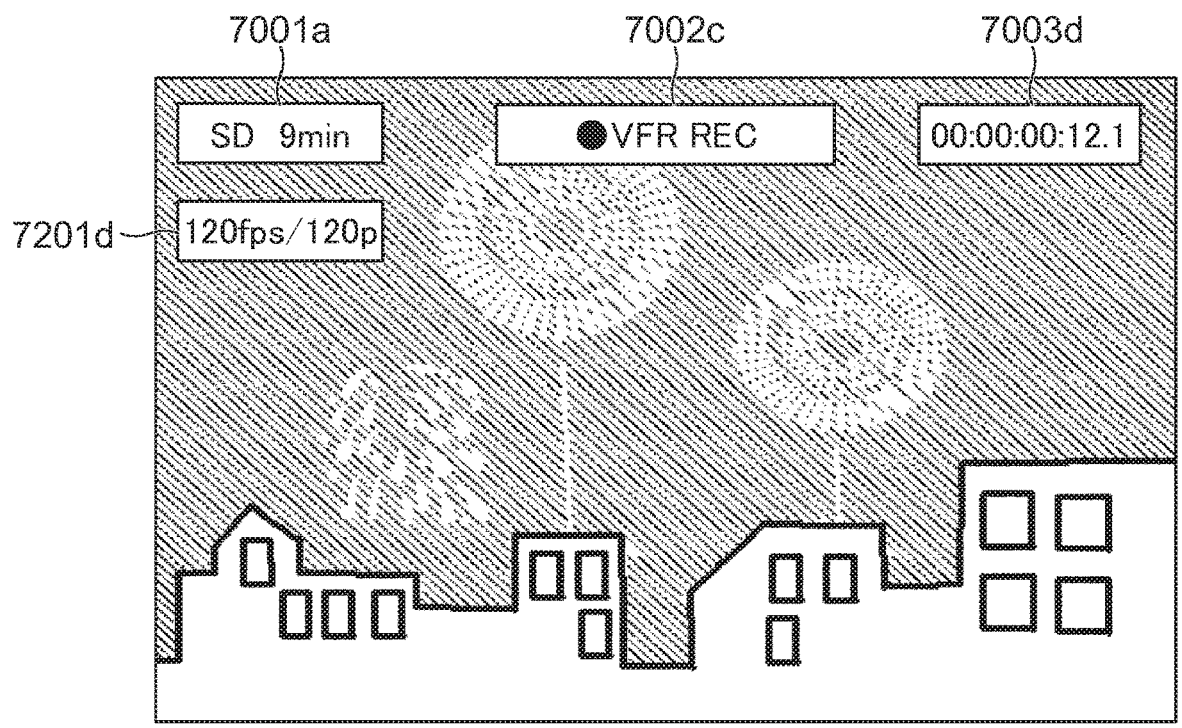
FIG. 7D is a view showing an example of the UI display of the image capture apparatus according to the first embodiment.

FIG. 7D shows the UI display displayed after the frame rate has been changed from 30p to 120p during recording of moving image data at VFR. The same components in FIG. 7D as those in FIG. 7C are denoted by the same reference numerals, and description thereof is omitted.

In a time code-displaying section 7003*d*, appearing in FIG. 7D, the moving image data generated by encoding the video signal at the frame rate of 120p is being recorded and the reproduction refresh rate information is set to VRR. Therefore, the time code is displayed as 00:00:00:12.1, for example.

Further, in a real-time displaying section 7201*d*, appearing in FIG. 7D, since the frame rate of the moving image data being recorded is 120p and the reproduction refresh rate information is set to VRR, there is displayed "120 fps/120p", for expression of the real time.

Figure 8:
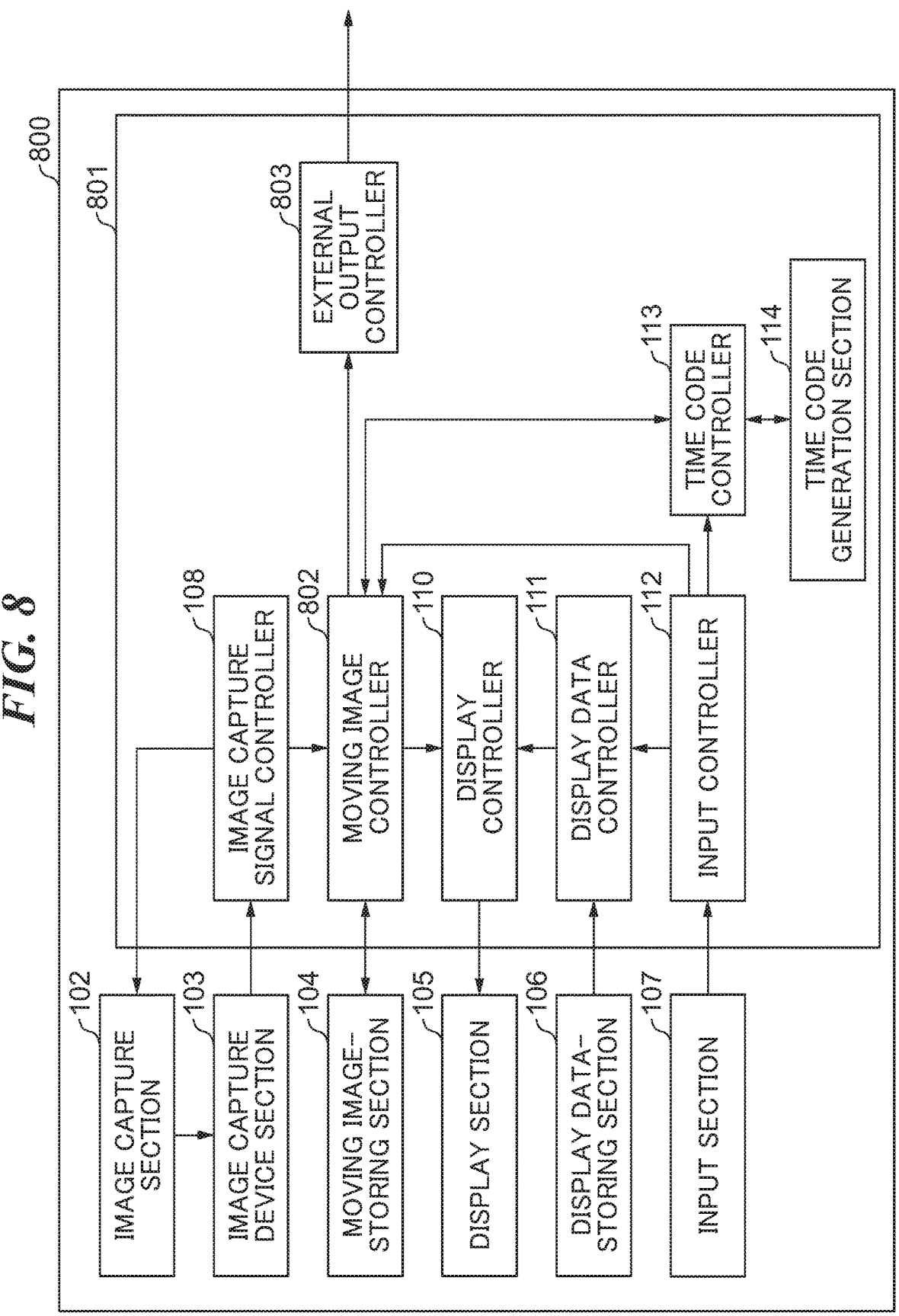
FIG. 8 is a block diagram of an image capture apparatus according to a second embodiment.

FIG. 8 is a block diagram of an image capture apparatus 800 according to a second embodiment.

The image capture apparatus 800 superimposes recording control information on the video signal when the video signal is output to the external output terminal at VRR. For this function, the image capture apparatus 800 differs from the image capture apparatus 100 in that the image capture apparatus 800 includes a system controller 801 in place of the system controller 101, a moving image controller 802 in place of the moving image controller 109, and an external output controller 803 in place of the external output controller 115. Note that the same component elements as those of the image capture apparatus 100 shown in FIG. 1 are denoted by the same reference numerals, and detailed description of redundant part is omitted.

The system controller 801 includes, as hardware components, a CPU (Central Processing Unit), a ROM (Read Only Memory), a RAM (Random Access Memory), and a system timer. The system controller 801 performs various control by executing control programs stored in the ROM, using the RAM as a work area.

The moving image controller 802 has a function of compressing (encoding) and expanding (decoding) a video signal. Therefore, for example, in a case where a video signal is sent from the image capture signal controller 108, the moving image controller 802 compresses (encodes) the video signal and outputs the compressed (encoded) moving image data to the moving image-storing section 104. Further, the moving image controller 802 requests the moving image-storing section 104, according to a user instruction sent from the input section 107 via the input controller 112, to send moving image data desired by the user. When the moving image data is sent from the moving image-storing section 104 in response to this request, the moving image controller 802 expands (decodes) the received data, and sends the decoded data to the display controller 110. With this, the moving image data is displayed on the display section 105. Further, in a case where a time code is sent from the time code controller 113, the moving image controller 802 superimposes the time code on the video signal, and then compresses (encodes) the video signal. Further, it is possible to send the video signal sent from the image capture signal controller 108 or moving image data sent from the moving image-storing section 104, to the external output controller 115, together with the time code superimposed on video data of each frame. Further, the moving image controller 802 can receive a recording start request or a recording stop request input by a user to the input section 107, via the input controller 112, and sends the user request to the external output controller 803 as recording control information.

When a video signal with a time code superimposed on video data of each frame and the recording control information are received from the moving image controller 802, the external output controller 803 superimposes the recording control information on the video signal, and outputs the video signal to an external apparatus. The external output controller 803 is formed by an external output terminal, such as an SDI (Serial Digital Interface) terminal or an HDMI (High-Definition Multimedia Interface) terminal. In a case where the external output controller 803 conforms to the standards of HDMI 2.1, the external output controller 803 can output a video to an external output at VRR, and further, by superimposing the recording control information on video data, the external output controller 803 is capable of controlling recording of an external recorder. That is, in the present embodiment, it is possible to cause a non-compressed video signal to be recorded in the external recorder at VFR.

In the present embodiment, in a case where VFR video signal is externally output at VRR, the process for changing the frame rate of the video signal for the external output controller 803 is performed only at the timing at which the value of frame of the time code is changed by an increment in the time code during recording of moving image data. Details of this frame rate-changing process for the external output controller 803 will be described with reference to FIG. 9.

Figure 9:
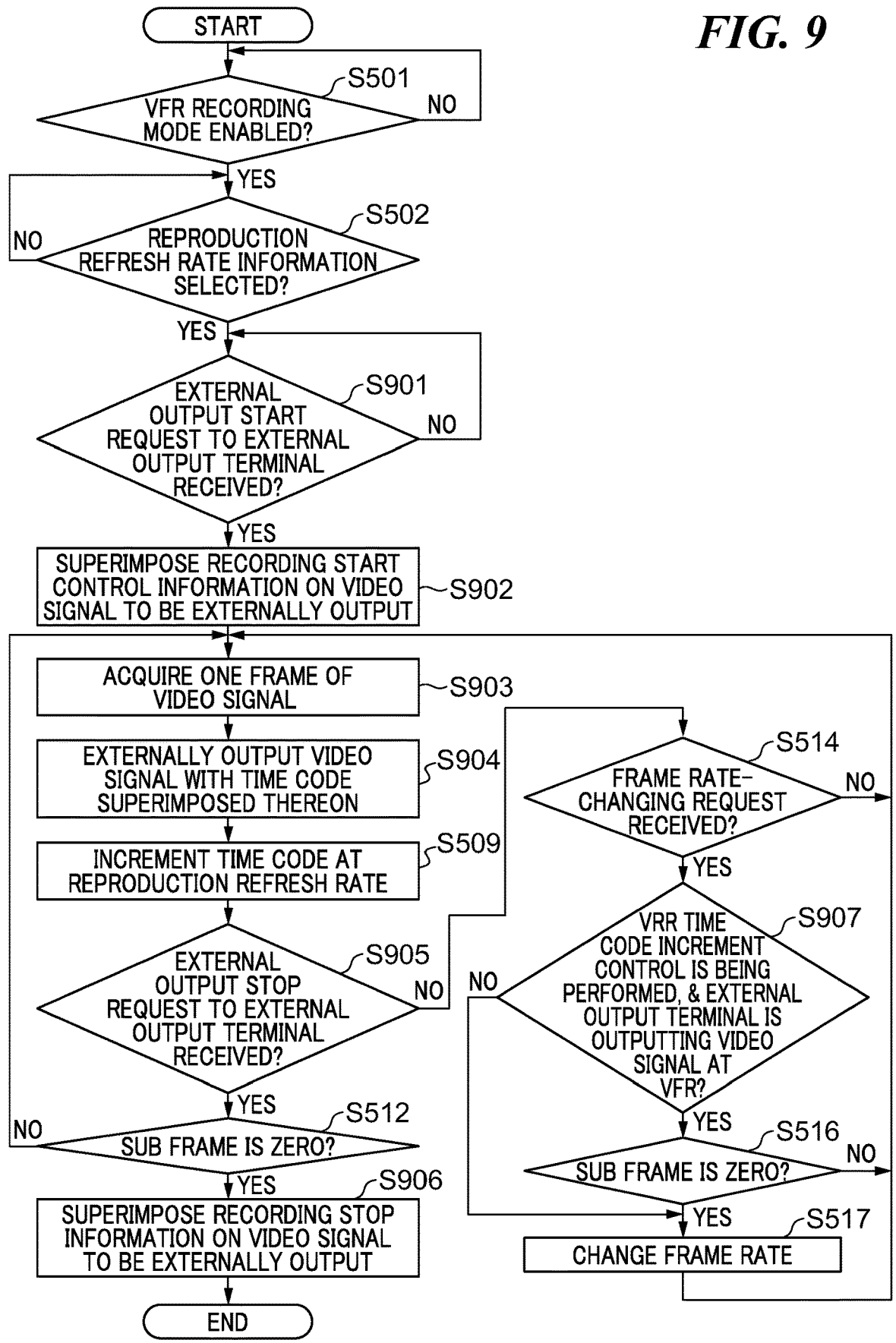
FIG. 9 is a flowchart of a frame rate-changing process according to the second embodiment, which is performed by the image capture apparatus shown in FIG. 8, for an external output controller.

FIG. 9 is a flowchart of the frame rate-changing process according to the present embodiment, which is performed for the external output controller 803 by the image capture apparatus 800. The present process is performed by the system controller 801 executing a program loaded from a program memory in a state in which the image capture apparatus 800 has been powered on and started up. Note that the same steps as those in FIG. 5 are denoted by the same step numbers, and detailed description of redundant part is omitted.

In the process in FIG. 9, a step S901 is executed in place of the step S503 in FIG. 5, and a step S902 is executed in place of the steps S504 to S506 in FIG. 5. Further, steps S903 and S904 are executed in place of the steps S507 and S508 in FIG. 5. Further, a step S905 is executed in place of the step S510 in FIG. 5, a step S906 is executed in place of the step S513 in FIG. 5, and a step S907 is executed in place of the step S515 in FIG. 5.

In the step S901, the input controller 112 determines whether or not a user instruction for requesting the external output controller 803 to start external output of the video signal has been input to the input section 107. If the external output start request has been input (YES to the step S901), the process proceeds to the step S902. If the external output start request has not been input (NO to the step S901), the process returns to the step S901. Note that in the present embodiment, in a case where the above-mentioned external output start request has been input, the input controller 112 instructs the external output controller 803 to superimpose recording start control information on the video signal to be externally output in the step S902, as described hereinafter. However, whether or not to perform the above-mentioned instruction may be selected by the user using the input section 107. Further, although not shown in FIG. 9, if the external output start request has been input, the input controller 112 instructs the time code controller 113 to send a time code to the moving image controller 802. Further, the input controller 112 instructs the moving image controller 802 to perform control for superimposing the time code sent from the time code controller 113 on video data of each frame of the video signal sent from the image capture signal controller 108.

In the step S902, the input controller 112 instructs the external output controller 803 to superimpose the recording start control information on the video signal to be externally output, and then executes the step S903.

Next, in the step S903, the moving image controller 802 acquires one frame of the video signal from the image capture signal controller 108, and generates video data, and then the process proceeds to the step S904.

In the step S904, the moving image controller 802 superimposes the time code sent from the time code controller 113 on the video data of one frame acquired in the step S903 and externally outputs the video data from the external output controller 803.

After that, in the step S509, the time code is incremented, similarly to the process in FIG. 5. That is, the time code generation section 114 increments the time code at CRR or VRR selected in the step S502 whenever the time code is sent to the moving image controller 802, i.e. whenever the time code is superimposed on video data of one frame.

After that, the process proceeds to the step S905. The video signal externally output from the external output controller 803 has not only a signal area for storing the video data and the time code of each frame, but also a signal area for superimposing meta data. Therefore, in the step S902, even when the external output controller 803 is implemented by any of an HDMI terminal and an SDI terminal, the recording start control information is superimposed on the signal area storing the meta data. This makes it possible to perform, if an external recorder side is compatible with the image capture apparatus 800, control for recording data in the external recorder in a manner linked with the recording control of the image capture apparatus 800.

In the step S905, the input controller 112 determines whether or not a user instruction for requesting the external output controller 803 to stop the external output of the video signal has been input to the input section 107. If the external output stop request has been input (YES to the step S905), and it is determined that the answer to the question of the step S512 is positive (YES), the process proceeds to the step S906. If the external output stop request has not been input (NO to the step S905), the process proceeds to the step S514.

In the step S906, the input controller 112 instructs the external output controller 803 to superimpose recording stop control information on the video signal to be externally output. Similar to the recording start control information, the recording stop control information is also superimposed on the area storing the meta data of the video signal to be externally output from the external output controller 803.

In the step S514, the input controller 112 determines whether or not a user instruction for requesting changing of the frame rate has been input to the input section 107. If the frame rate-changing request has been input (YES to the step S514), the input controller 112 displays a UI display, described hereinafter with reference to FIG. 10B, and then the process proceeds to the step S907 after the user has selected a frame rate for change. If the frame rate-changing request has not been input (NO to the step S514), the process returns to the step S903.

In the step S907, the input controller 112 determines whether or not VRR has been selected as the reproduction refresh rate in the step S502, i.e. whether or not the VRR time code increment control is being performed. Further, the input controller 112 determines whether or not the external output controller 803 is externally outputting the video signal at VFR. If the VRR time code increment control is being performed and the external output controller 803 is externally outputting the video signal at VFR (YES to the step S907), the process proceeds to the step S516, whereas if not (NO to the step S907), the process proceeds to the step S517. In a case where the external output controller 803 is an HDMI terminal, it is possible to acquire information indicating whether or not a connection destination conforms to the standards of HDMI 2.1 from the connection destination. Therefore, in a case where the information indicating that the connection destination conforms to the standards of HDMI 2.1 has been acquired from the connection destination, the input controller 112 may determine only whether or not the time code for VRR is being outputted to the external output controller 803 in the step S907. On the other hand, in a case where the external output controller 803 is an SDI terminal, the information on the connection destination cannot be acquired. Therefore, in this case, whether or not the connection destination conforms to the standards of HDMI 2.1 is determined by determining whether or not the image capture apparatus 800 is outputting the video signal at VFR.

Note that in the process in FIG. 9, in a case where the VFR recording mode has been enabled, and VRR has been selected as the reproduction refresh rate information, changing of the frame rate of the video signal being output to the external output controller 803 is performed in the same manner as in the process shown in FIG. 6, and hence description thereof is omitted.

Next, the UI display displayed for the user to change the settings of the external output controller 803 to superimpose the recording control information, via the input section 107, will be described with reference to FIGS. 10A to 10C.

Figure 10A:
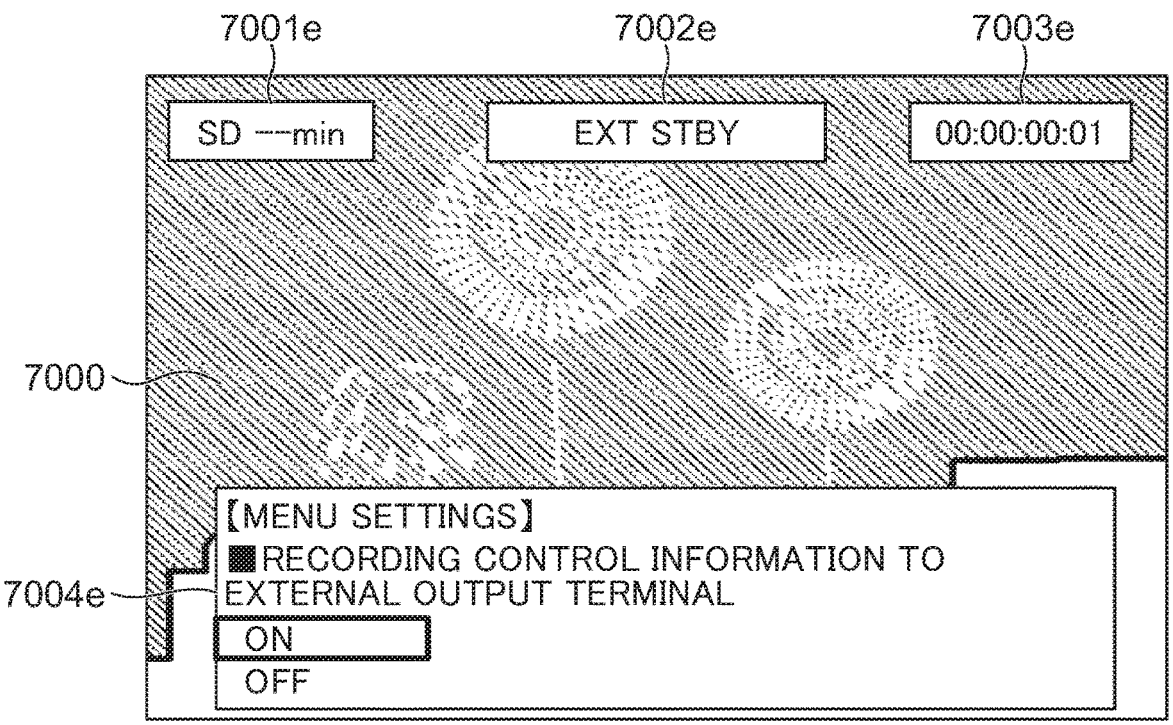
FIG. 10A is a view showing an example of a UI display of the image capture apparatus according to the second embodiment.

FIG. 10A shows the UI display of a recording control information-setting screen for setting the recording control information for the external output controller 803. In FIG. 10A, the same component elements as those in FIG. 7A are denoted by the same reference numerals, and description thereof is omitted.

In a case where video signal is externally output as in the present embodiment, the moving image data is not recorded in the moving image-storing section 104, and hence, as shown in FIG. 10A, the remaining time, in which moving image data can be recorded in the moving image-storing section 104, is not displayed in a remaining recording time-displaying section 7001e.

Further, in a case where the video signal is externally output as in the present embodiment, an operation status-displaying section 7002e displays the operation status of not the image capture apparatus 100 but the external output controller 803. For example, in a case where the solid circle is displayed as shown in an operation status-displaying section 7002f in FIG. 10B, referred to hereinafter, it indicates that the video signal is being externally output from the external output controller 803 at present. On the other hand, in a case where the solid circle is not displayed as shown in the operation status-displaying section 7002a as shown in FIG. 7A, it indicates that the video signal is not being externally output from the external output controller 803 at present.

A menu setting-displaying section 7004e displays a selection screen for selecting whether or not to enable the external output controller 803 to superimpose the recording control information.

Figure 10B:
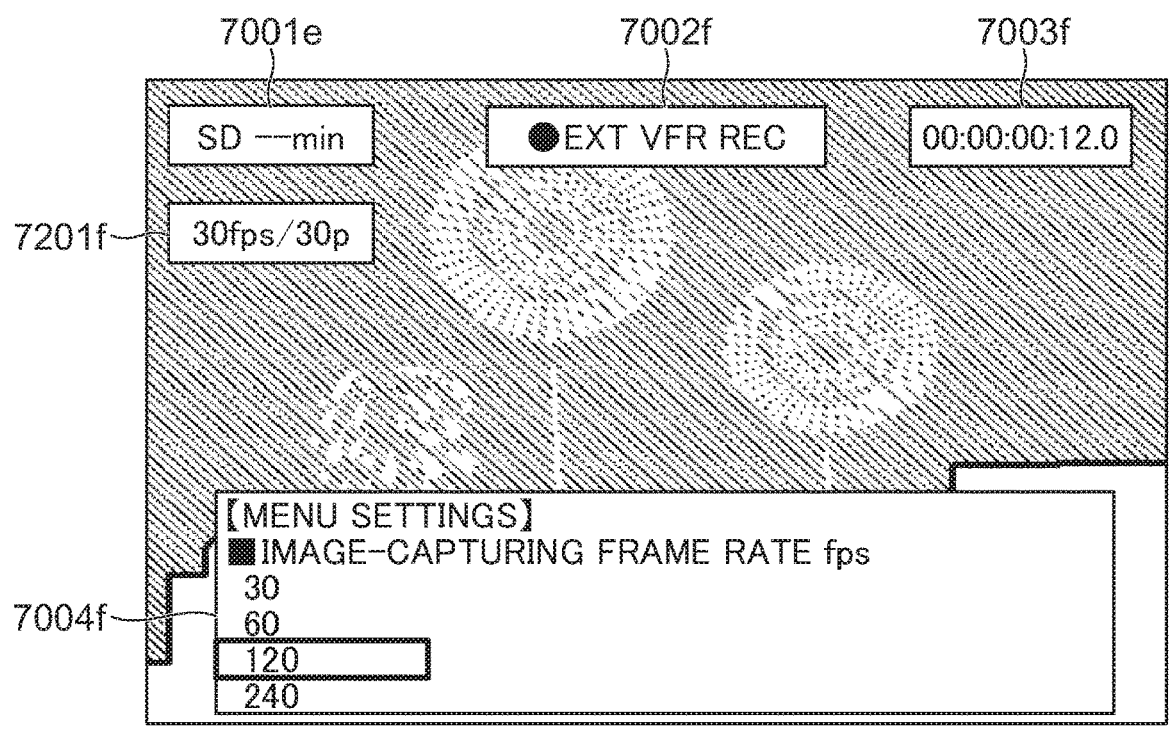
FIG. 10B is a view showing an example of the UI display of the image capture apparatus according to the second embodiment.

FIG. 10B shows the UI display of a frame rate-setting screen, displayed when a user instruction for requesting changing of the frame rate is input to the input section 107 during output of the video signal to the external output controller 803 at VFR.

In a case where the operation status of the external output controller 803 indicates a state in which the video signal is being externally output at VFR, EXT VFR REC with the solid circle, which is indicative of this fact, is displayed in the operation status-displaying section 7002f appearing in FIG. 10B.

Further, as indicated in a time code-displaying section 7003f, since external output of the video signal at VFR has been started, the time code advances. The video signal is being externally output at the frame rate of 30p and the reproduction refresh rate information is set to VRR. Therefore, the time code is displayed in the time code-displaying section 7003f, appearing in FIG. 10B, as 00:00:00:12.0, for example.

Further, since the frame rate of the video signal being externally output is 30p, and the reproduction refresh rate information is set to VRR, "30 fps/30p" is displayed in a real-time displaying section 7201f, for expression of the real time.

A menu setting-displaying section 7004f displays a frame rate selection screen.

Figure 10C:
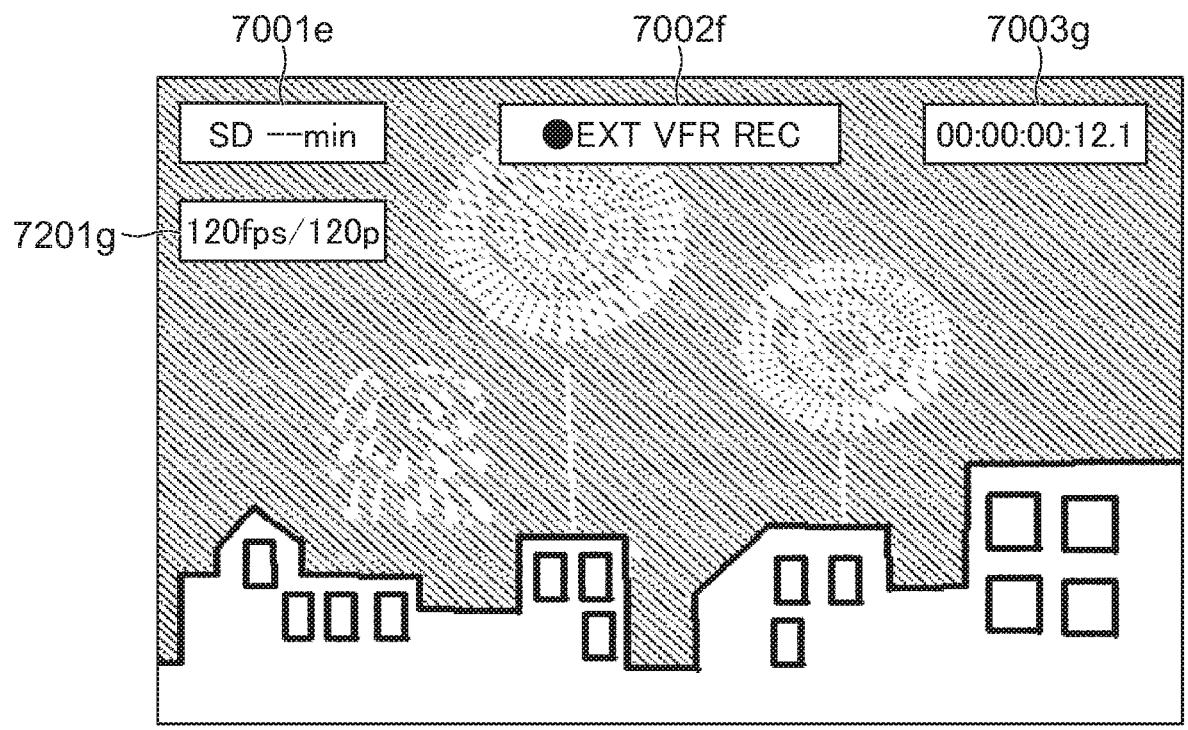
FIG. 10C is a view showing an example of the UI display of the image capture apparatus according to the second embodiment.

FIG. 10C shows the UI display displayed after the frame rate has been changed from 30p to 120p during output of the video signal to the external output controller 803 at VFR. In FIG. 10C, the same component elements as those in FIG. 10B are denoted by the same reference numerals, and description thereof is omitted.

A time code-displaying section 7003g displays the value of the time code generated by the time code generation section 114. The video signal is being externally output at the frame rate of 120p and the reproduction refresh rate information is set to VRR. Therefore, the time code is displayed in the time code-displaying section 7003g, appearing in FIG. 10C, as 00:00:00:12.1, for example.

Further, since the frame rate of the video signal being externally output is 120p and the reproduction refresh rate information is set to VRR, "120 fps/120p" is displayed in a real-time displaying section 7201g, for expression of the real time.

Although in the present embodiment, the description is given of the external output controller 803, recording of moving image data at VFR in the moving image-storing section 104, described in the first embodiment, and external output of the video signal to the external output controller 803 at VFR may be simultaneously performed.

Figure 11:
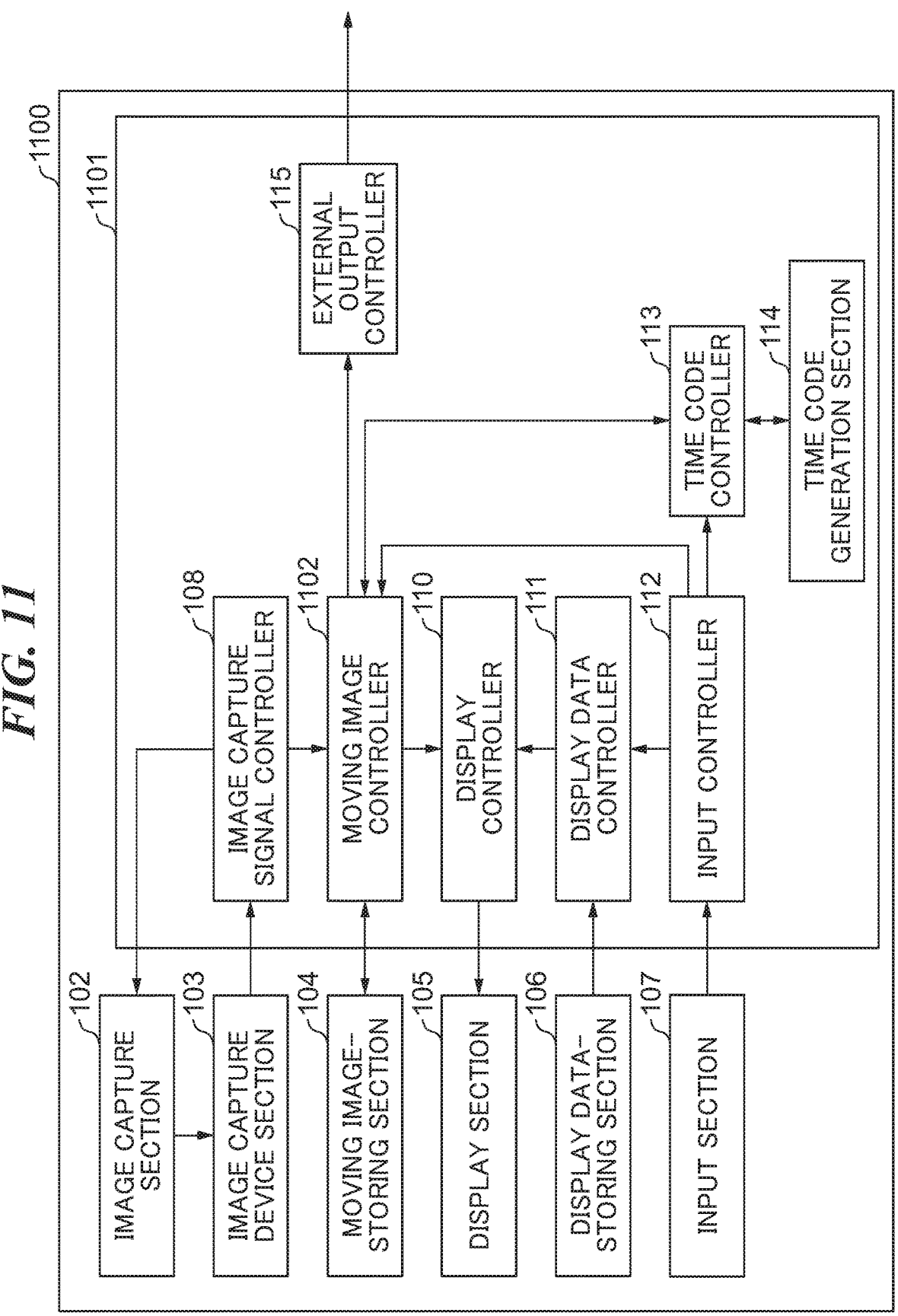
FIG. 11 is a block diagram of an image capture apparatus according to a third embodiment.

FIG. 11 is a block diagram of an image capture apparatus 1100 according to a third embodiment.

In the present embodiment, in a case where the image capture apparatus 1100 is performing pre-recording for accumulating moving image data for a past predetermined time period, so long as a moving image is being captured at a high frame rate, changing of the frame rate is allowed only at a timing at which the value of frame is changed. This makes it possible to reproduce or output moving image data at a variable refresh rate corresponding to the real time even during pre-recording. To this end, the image capture apparatus 1100 differs from the image capture apparatus 100 in that the image capture apparatus 1100 includes a system controller 1101 in place of the system controller 101, and a moving image controller 1102 in place of the moving image controller 109. Note that the same component elements as those of the image capture apparatus 100 shown in FIG. 1 and the image capture apparatus 800 shown in FIG. 8 are denoted by the same reference numerals, and detailed description of redundant part is omitted.

The system controller 1101 includes, as hardware components, a CPU (Central Processing Unit), a ROM (Read Only Memory), a RAM (Random Access Memory), and a system timer. The system controller 1101 performs various control by executing a control program stored in the ROM, using the RAM as a work area.

The moving image controller 1102 has a function of compressing (encoding) and expanding (decoding) a video signal. Therefore, for example, in a case where the video signal is sent from the image capture signal controller 108, the moving image controller 1102 compresses (encodes) the video signal, and outputs the compressed (encoded) moving image data to the moving image-storing section 104. Further, the moving image controller 1102 requests the moving image-storing section 104, according to a user instruction sent from the input section 107 via the input controller 112, to send moving image data desired by the user. When the moving image data is sent from the moving image-storing section 104 in response to this request, the moving image controller 1102 expands (decodes) the received data, and sends the decoded data to the display controller 110. With this, the moving image data is displayed on the display section 105. Further, in a case where a time code is sent from the time code controller 113, the moving image controller 1102 superimposes the time code on the moving image data, and then compresses (encodes) the moving image data. Further, it is possible to send the video signal sent from the image capture signal controller 108, or moving image data sent from the moving image-storing section 104, to the external output controller 115, together with the time code. Further, the moving image controller 1102 can receive a recording start request or a recording stop request from a user, input to the input section 107, via the input controller 112, and sends the user request to the external output controller 115. Further, the moving image controller 1102 can receive a request for enabling a pre-recording mode (pre-recording start request) input by a user to the input section 107, via the input controller 112, and start pre-recording. Here, pre-recording refers to a function of accumulating the past compressed (encoded) moving image data in the RAM (moving image-accumulating section) of the system controller 1101, and starting recording of moving image data including the accumulated moving image data when a recording start request is received from a user. In the present embodiment, a description will be given of a case where compressed (encoded) moving image data for past three seconds can be accumulated in the RAM, by way of example. That is, in the present embodiment, in a case where pre-recording is performed, it is possible to record moving image data from three seconds before receiving a request for starting recording of moving image data, in the moving image-storing section 104.

In the present embodiment, in a case where moving image data generated by encoding the VFR video signal is read out at VRR, the process for changing the frame rate of the video signal is performed only at the same timing as in the process in FIG. 5 also during pre-recording, i.e. during accumulation of moving image data for three seconds in the RAM. That is, changing of the frame rate is allowed only at a timing at which the value of frame of the time code is changed by an increment of the time code in recording the moving image data. This frame rate-changing process will be described with reference to FIGS. 12A and 12B.

Figure 12A:
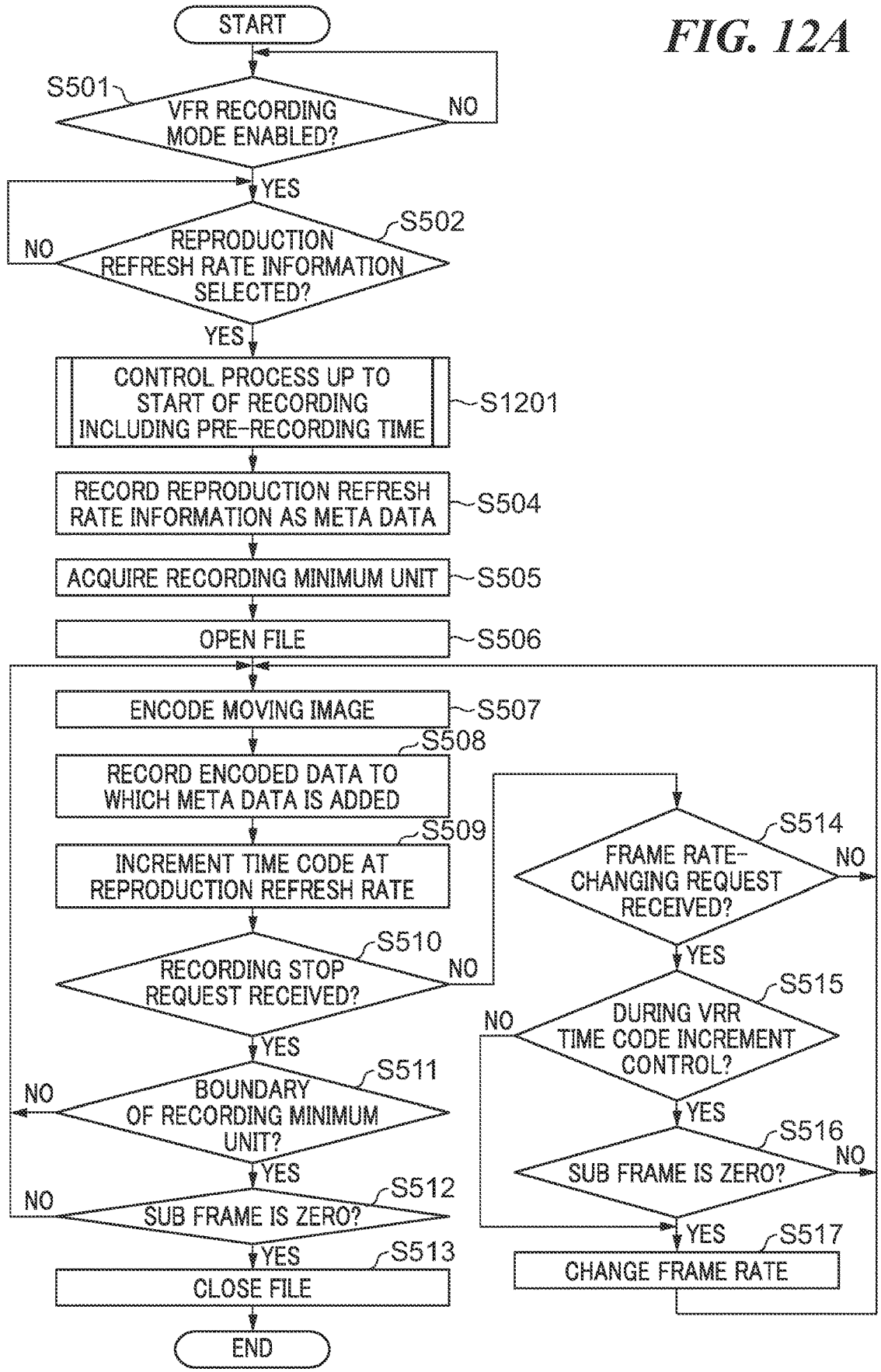
FIG. 12A is a flowchart of a frame rate-changing process according to the third embodiment, which is performed by the image capture apparatus shown in FIG. 11 in a case where pre-recording is performed.

FIG. 12A is a flowchart of the frame rate-changing process according to the present embodiment, performed by the image capture apparatus 1100 in a case where pre-recording is performed. The present process is performed by the system controller 1101 that executes a program loaded from a program memory in a state in which the image capture apparatus 1100 has been powered on and started up. Note that the same steps as those in FIG. 5 are denoted by the same step numbers, and detailed description of redundant part is omitted.

The process in FIG. 12A differs from the process in FIG. 5 in that a step S1201 is executed in place of the step S503.

Figure 12B:
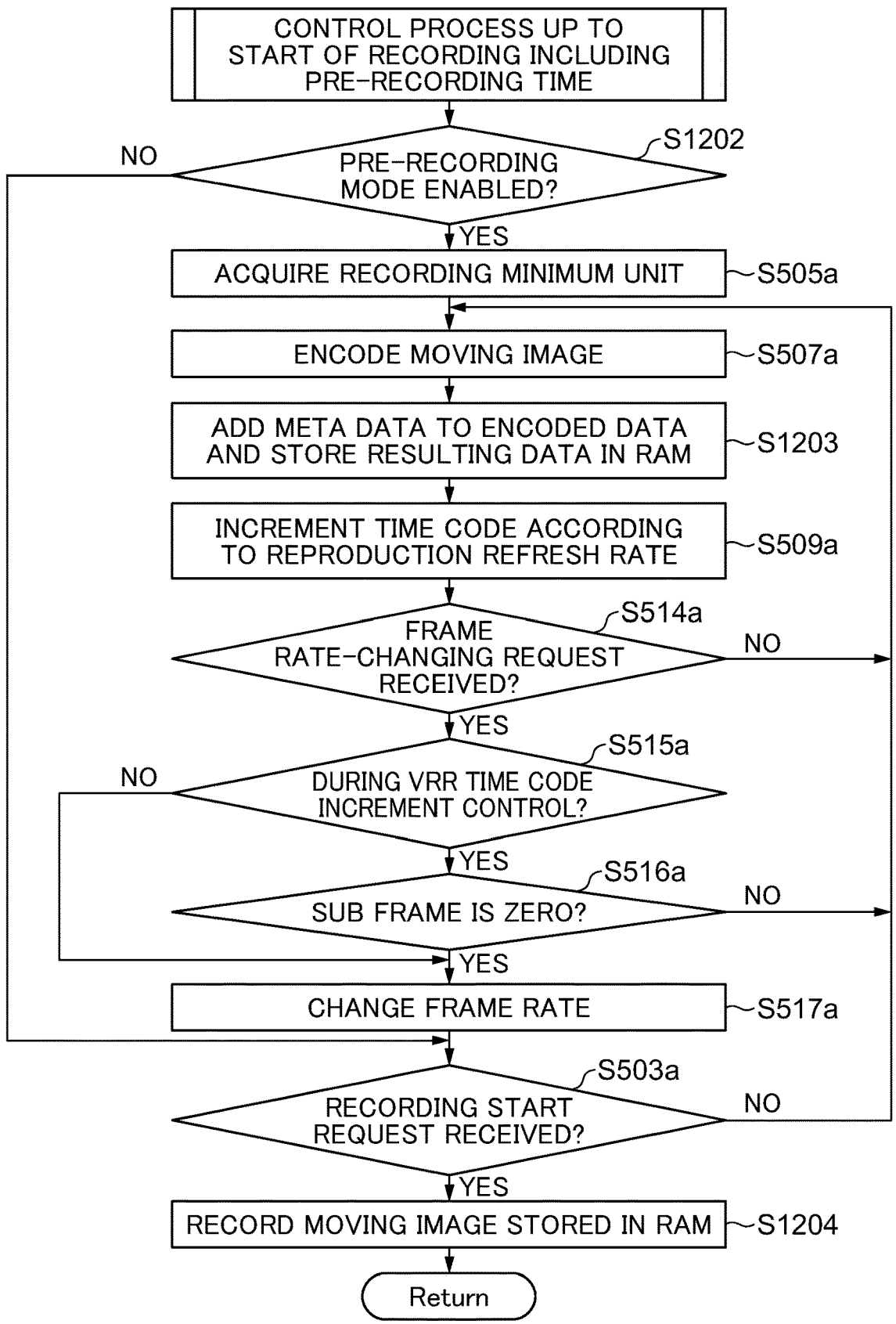
FIG. 12B is a flowchart of a control process before starting recording, including pre-recording, which is executed in a step in FIG. 12A.

Referring to FIG. 12A, first, after execution of the steps S501 and S502, the process proceeds to a step S1201, wherein a control process up to the start of recording, including pre-recording time, shown in FIG. 12B, is performed. That is, pre-recording is started according to a pre-recording start request provided by a user before starting recording of moving image data at VFR. When the step S1201 is terminated, the step S504 et seq. in FIG. 12A are executed.

Referring to FIG. 12B, first, in a step S1202, the input controller 112 determines whether or not pre-recording mode has been enabled by a user operation input to the input section 107 on a UI display, described hereinafter with reference to FIG. 13A. If pre-recording mode has been enabled, i.e. if a pre-recording start request has been received from a user (YES to the step S1202), the same processing operations as the steps S505 and S507 in FIG. 5 are executed in steps S505a and S507a, and then the process proceeds to a step S1203. If pre-recording mode has not been enabled (NO to the step S1202), the process proceeds to a step S503a. Similar to the step S507, in the step S507a, the input controller 112 also instructs the time code controller 113 to send a time code to the moving image controller 1102. When the time code controller 113 sends a time code to the moving image controller 1102 in response to the instruction received from the input controller 112, the process proceeds to a step S1203.

In the step S1203, the moving image controller 1102 adds the meta data including the time code received from the time code controller 113 to the moving image data generated by compressing one frame of the video signal in the step S507a, and accumulates the resulting data in the RAM of the system controller 1101. That is, if it is determined in the step S1202 that the pre-recording start request has been received from the user, the moving image controller 1102 performs control for accumulating moving image data in the RAM whenever moving image data is generated from one frame of the video signa. After that, the process proceeds to a step S509a. Here, it is assumed that the RAM has a capacity capable of holding at least moving image data and meta data for three seconds. Further, if the amount of moving image data and meta data, accumulated by the moving image controller 1102 exceeds the accumulation amount for three seconds, the area on the RAM, storing the old moving image data and meta data, is overwritten with new moving image data and meta data.

In the step S509a, the time code controller 113 instructs the time code generation section 114 to increment the time code according to the refresh rate information selected in the step S502. That is, the time code controller 113 causes the time code generation section 114 to increment the time code at CRR or VRR, selected in the step S502, whenever the time code controller 113 sends a time code to the moving image controller 1102. After that, the same processing operations in the steps S514 to S517 in FIG. 5 are executed in steps 514*a* to 517*a*, and then the process proceeds to the step S503*a*.

In the step S503*a*, the input controller 112 determines whether or not a user instruction for requesting starting recording of the moving image data has been input to the input section 107. If the recording start request has been input (YES to the step S503*a*), the process proceeds to a step S1204. If the recording start request has not been input (NO to the step S503*a*), the process returns to the step S507*a*.

In the step S1204, the input controller 112 instructs the moving image controller 1102 to record the moving image data and the meta data for three seconds, accumulated in the RAM, in the moving image-storing section 104 according to the instruction in the step S1203, followed by terminating the present process.

Note that in the process in FIG. 12A, in a case where the VFR recording mode has been enabled and VRR has been selected as the reproduction refresh rate information, changing of the frame rate during pre-recording in the process in FIG. 12B is performed in the same manner as in the process shown in FIG. 6, and hence description thereof is omitted.

Next, the UI display displayed for the user to select ON/OFF of the pre-recording mode using the input section 107 and change the frame rate during pre-recording will be described with reference to FIGS. 13A to 13C.

Figure 13A:
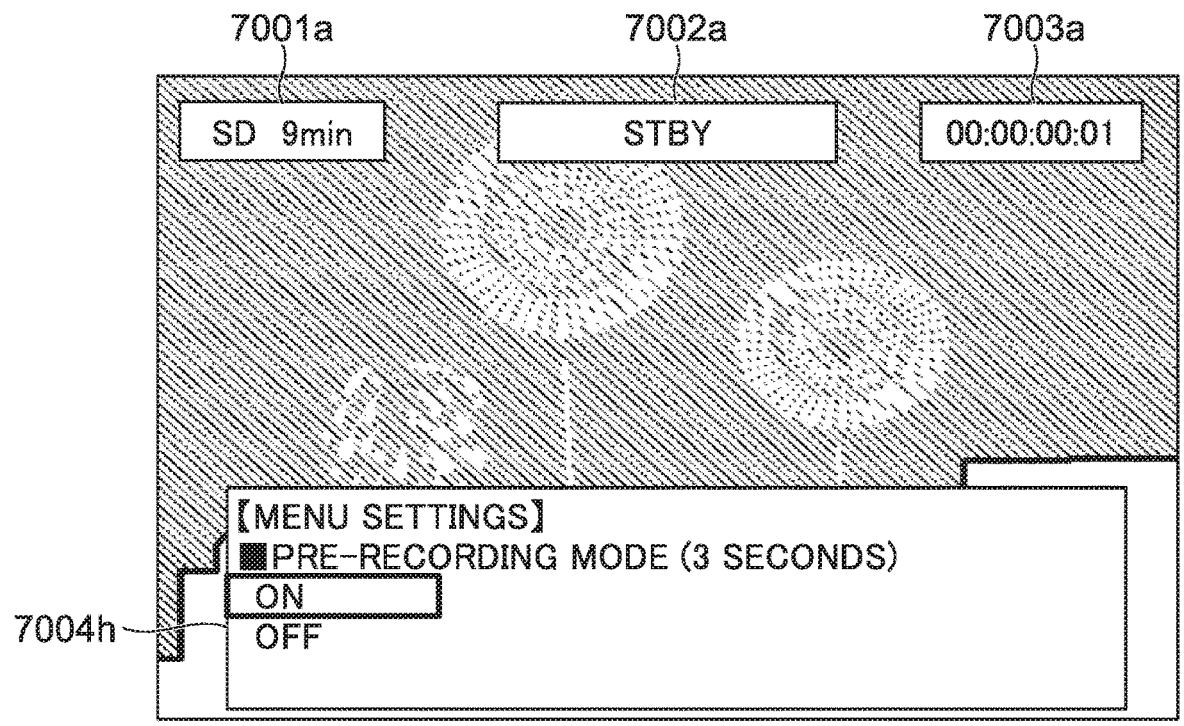
FIG. 13A is a view showing an example of a UI display of the image capture apparatus according to the third embodiment.

FIG. 13A shows the UI display of a pre-recording mode-setting screen. In FIG. 13A, the same component elements as those in FIG. 7A are denoted by the same reference numerals and description thereof is omitted.

A menu setting-displaying section 7004*h* displays a screen for selecting whether the pre-recording mode is set to ON (enabled) or OFF (disabled).

Figure 13B:
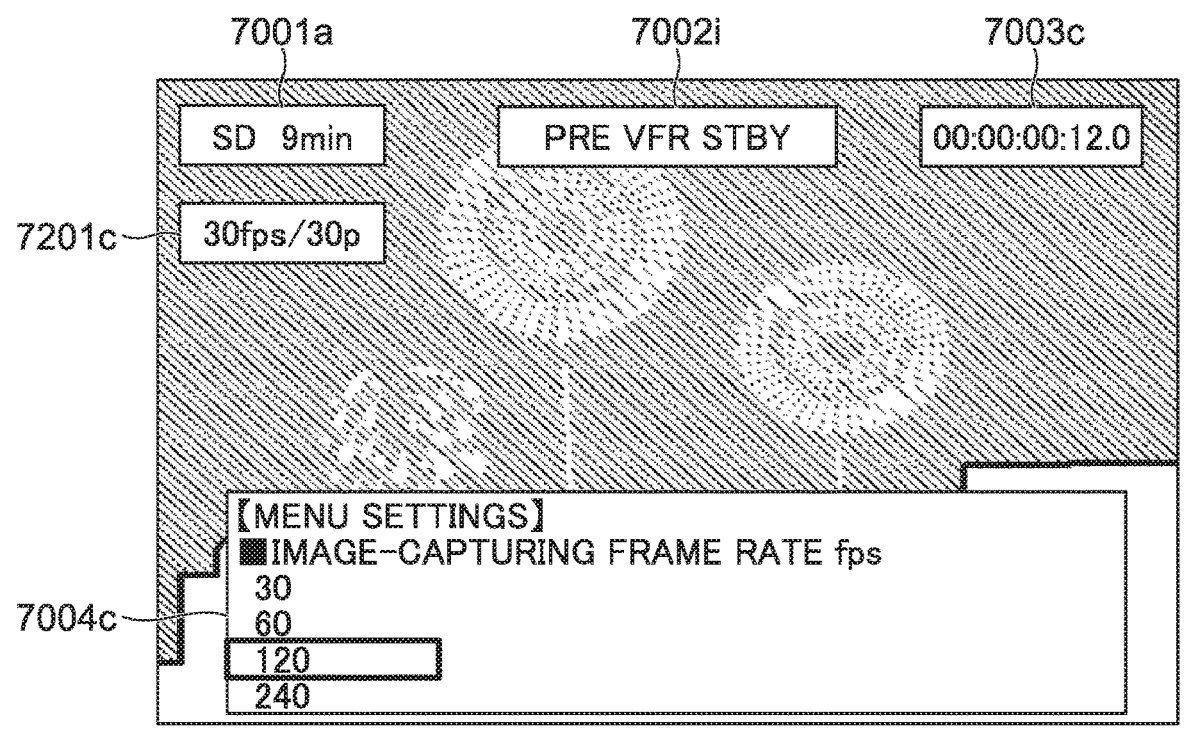
FIG. 13B is a view showing an example of the UI display of the image capture apparatus according to the third embodiment.

FIG. 13B shows the UI display of a frame rate-setting screen displayed when a user instruction for requesting changing of the frame rate is input to the input section 107 during pre-recording. In FIG. 13B, the same component elements as those in FIG. 7C are denoted by the same reference numerals and description thereof is omitted.

In a case where, after the VFR recording mode has been set to ON in the menu setting-displaying section 7004*a* appearing in FIG. 7A, the pre-recording mode is set to ON in the menu setting-displaying section 7004*h* appearing in FIG. 13A, the operation status of the image capture apparatus 1100 indicates a state in which the pre-recording is being performed in the VFR recording mode. Therefore, "PRE VFR STBY" indicating this fact is displayed in an operation status-displaying section 7002*i* appearing in FIG. 13B.

Further, as indicated in the time code-displaying section 7003*c* in FIG. 13B, since pre-recording is being performed, the time code advances. This is because unless the time code advances, the time code of the accumulated meta data continues to have the same value.

Figure 13C:
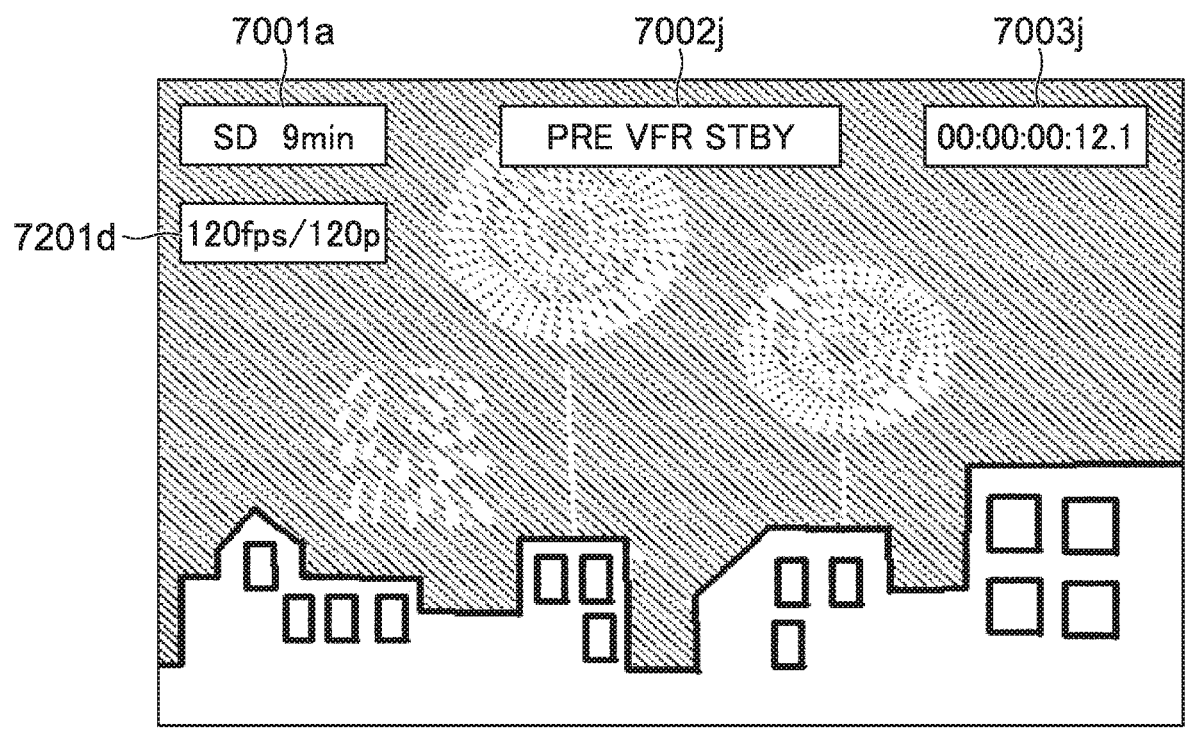
FIG. 13C is a view showing an example of the UI display of the image capture apparatus according to the third embodiment.

FIG. 13C shows the UI display displayed after the frame rate has been changed from 30p to 120p during pre-recording.

By using the above-described UI displays, the user is enabled to input a frame rate-changing request even during pre-recording, in the same manner as during the recording at VFR.

The present invention has been described heretofore based on the embodiments thereof. However, the present invention is not limited to these embodiments, but it is to be understood that the invention includes various forms within the scope of the gist of the present invention. Further, it is possible to combine parts of the embodiments on an as-needed basis.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034469 filed Feb. 27, 2019, which is hereby incorporated by reference herein in its entirety.

What is claimed is:

1. An image capture apparatus comprising:
   (a) a memory and at least one processor and/or (b) at least one circuit, which functions as a plurality of units comprising:
   (1) a time code generation unit configured to generate time codes to be added to respective frames of moving image data, the time codes including respective values of sub frame for differentiating between frames that were captured at a high-frame rate;
   (2) an addition unit configured to add the time codes generated by the time code generation unit to respective frames of the moving image data; and
   (3) a control unit configured to change an image-capturing frame rate of the moving image data according to a frame rate-changing request from a user,
   wherein the control unit changes the image-capturing frame rate of the moving image data at a timing at which the value of sub frame of one of the time codes becomes zero.

2. The image capture apparatus according to claim 1, further comprising a recording unit configured to record the moving image data having the time codes added to respective frames by the addition unit, in a recording medium.

3. The image capture apparatus according to claim 1, wherein in a case where the frame rate-changing request is received from the user at a timing at which the value of sub frame of the time code is not zero, the control unit does not change the image-capturing frame rate at a frame whose value of sub frame of the time code is not zero, but changes the image-capturing frame rate from a frame whose value of sub frame of the time code becomes zero.

4. The image capture apparatus according to claim 1, wherein in a case where the frame rate-changing request is a frame rate-changing request for changing the frame rate from a predetermined frame rate to a frame rate higher than the predetermined frame rate, the control unit changes the image-capturing frame rate at a timing at which the frame rate-changing request is received regardless of the value of sub frame of the time code.

5. The image capture apparatus according to claim 4, wherein the predetermined frame rate is 30 fps.

6. The image capture apparatus according to claim 1, wherein the plurality of units further comprises a setting unit configured to set a variable refresh rate or a constant refresh rate as a refresh rate for reproduction of the moving image data, and
wherein in a case where the variable refresh rate is set as the refresh rate for reproduction, the control unit changes the image-capturing frame rate of the moving image data at a timing at which the value of sub frame of the time code becomes zero, whereas in a case where the constant refresh rate is set as the refresh rate for reproduction, the control unit changes the image-capturing frame rate of the moving image data at a timing at which the frame rate-changing request is received from the user regardless of the value of sub frame of the time code.

7. The image capture apparatus according to claim 1, further comprising an output unit configured to externally output the moving image data to which time code has been added.

8. The image capture apparatus according to claim 7, wherein in a case where the moving image data is being externally output by the output unit at the variable refresh rate, the control unit changes the image-capturing frame rate of the moving image data at a timing at which the value of sub frame of the time code becomes zero, whereas in a case where the moving image data is not being externally output by the output unit at the variable refresh rate, the control unit changes the image-capturing frame rate of the moving image data at a timing at which the frame rate-changing request is received from the user regardless of the value of sub frame of the time code.

9. The image capture apparatus according to claim 7, wherein in a case where an external output stop request is received from the user when the moving image data is being externally output by the output unit, the output unit stops external output of the moving image data when the value of sub frame of the time code added by the addition unit becomes zero.

10. The image capture apparatus according to claim 2, wherein in a case where the frame rate-changing request is received from the user when the moving image data is not being recorded in the recording medium, the control unit changes the frame rate of the moving image data at a timing at which the frame rate-changing request is received from the user.

11. The image capture apparatus according to claim 2, wherein in a case where a recording stop request is received from the user when the moving image data is being recorded in the recording medium, the control unit stops recording of the moving image data in the recording medium when a frame corresponding to an integer multiple of a recording minimum unit is stored in the recording medium and also the value of sub frame of the time code added by the addition unit becomes zero.

12. The image capture apparatus according to claim 1, wherein the time code is information defined by SMPTE ST 12-3.

13. A method of controlling an image capture apparatus, the method comprising:
  generating time codes to be added to respective frames of moving image data, the time codes including respective values of sub frame for differentiating between frames that were captured at a high-frame rate;
  adding the time codes generated to respective frames of the moving image data; and
  changing an image-capturing frame rate of the moving image data according to a frame rate-changing request from a user,
  wherein said changing includes changing the image-capturing frame rate of the moving image data at a timing at which the value of sub frame of one of the time codes becomes zero.

14. A non-transitory computer-readable storage medium storing a computer-executable program for executing a method of controlling an image capture apparatus, wherein the method comprises:
  generating time codes to be added to respective frames of moving image data, the time codes including respective values of sub frame for differentiating between frames that were captured at a high-frame rate;
  adding the time codes generated to respective frames of the moving image data; and
  changing an image-capturing frame rate of the moving image data according to a frame rate-changing request from a user,
  wherein said changing includes changing the image-capturing frame rate of the moving image data at a timing at which the value of sub frame of one of the time codes becomes zero.

* * * * *